US012573342B2

(12) United States Patent
Shiobara et al.

(10) Patent No.: US 12,573,342 B2
(45) Date of Patent: Mar. 10, 2026

(54) CONTROL DEVICE FOR DISPLAY PANEL, DISPLAY DEVICE, AND CONTROL METHOD BY CONTROL DEVICE FOR DISPLAY PANEL

(71) Applicant: SHARP KABUSHIKI KAISHA, Sakai City (JP)

(72) Inventors: Naoki Shiobara, Sakai City (JP); Masafumi Ueno, Sakai City (JP); Masaaki Moriya, Sakai City (JP); Masafumi Kawai, Sakai City (JP); Mohammad Reza Kazemi, Sakai City (JP); Hiroyuki Furukawa, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/866,175

(22) PCT Filed: Jun. 27, 2022

(86) PCT No.: PCT/JP2022/025424
§ 371 (c)(1),
(2) Date: Nov. 15, 2024

(87) PCT Pub. No.: WO2024/003963
PCT Pub. Date: Jan. 4, 2024

(65) Prior Publication Data

US 2025/0322795 A1 Oct. 16, 2025

(51) Int. Cl.
*G09G 3/3233* (2016.01)
*G09G 3/00* (2006.01)

(52) U.S. Cl.
CPC ........... *G09G 3/3233* (2013.01); *G09G 3/006* (2013.01); *G09G 2300/0819* (2013.01);
(Continued)

(58) Field of Classification Search
CPC ................ G09G 3/3233; G09G 3/006; G09G 2300/0819; G09G 2300/0842;
(Continued)

(56) References Cited

U.S. PATENT DOCUMENTS 10,380,942 B2 * 8/2019 An ....................... G09G 3/3233
10,607,548 B2 * 3/2020 Lee ...................... G09G 3/3233
(Continued)

FOREIGN PATENT DOCUMENTS

WO 2014/208459 A1 12/2014
WO 2017/104631 A1 6/2017
WO 2019/186895 A1 10/2019

*Primary Examiner* — Jeff Piziali
(74) *Attorney, Agent, or Firm* — ScienBiziP, P.C.

(57) ABSTRACT

A control device for a display panel includes a plurality of pixels each including: a self-luminous element; and a transistor that controls a current that flows through the self-luminous element, the control device including: a measuring unit configured to measure a luminescence characteristic of the self-luminous element and an operating characteristic of the transistor; and a correction unit configured to correct an input video signal that enables identifying a video to be displayed on the display panel, based on luminescence data related to the luminescence characteristic and operation data related to the operating characteristic, wherein the measuring unit measures the luminescence characteristic at a frequency that is lower than a frequency at which the measuring unit measures the operating characteristic.

7 Claims, 17 Drawing Sheets

(52) U.S. Cl.
CPC ............... *G09G 2300/0842* (2013.01); *G09G 2300/0861* (2013.01); *G09G 2320/02* (2013.01); *G09G 2320/041* (2013.01); *G09G 2320/045* (2013.01); *G09G 2360/145* (2013.01)

(58) Field of Classification Search
CPC ....... G09G 2300/0861; G09G 2320/02; G09G 2320/041; G09G 2320/045; G09G 2360/145
See application file for complete search history.

(56) References Cited

U.S. PATENT DOCUMENTS

| | | | | |
|---|---|---|---|---|
| 10,964,257 | B2 * | 3/2021 | Kim | G09G 3/3275 |
| 11,308,883 | B2 * | 4/2022 | Hsieh | G09G 3/3258 |
| 11,361,714 | B2 * | 6/2022 | Lee | G09G 3/3275 |
| 11,562,705 | B2 * | 1/2023 | Cho | G09G 3/3607 |
| 11,632,830 | B2 * | 4/2023 | Malhotra | H05B 45/37 315/158 |
| 11,727,835 | B2 * | 8/2023 | Ha | G09G 3/3258 345/204 |
| 11,837,181 | B2 * | 12/2023 | Monomoshi | G09G 3/2096 |
| 11,922,869 | B2 * | 3/2024 | Bang | G09G 3/3225 |
| 2016/0111044 | A1 | 4/2016 | Kishi et al. | |
| 2018/0366061 | A1 * | 12/2018 | Furukawa | G09G 3/20 |
| 2021/0020102 | A1 * | 1/2021 | Yamamoto | G09G 3/3233 |

* cited by examiner

CONTROL DEVICE FOR DISPLAY PANEL, DISPLAY DEVICE, AND CONTROL METHOD BY CONTROL DEVICE FOR DISPLAY PANEL

TECHNICAL FIELD

The present disclosure relates to a control device for a display panel, a display device, and a control method by a control device for a display panel.

BACKGROUND ART

Research and development has been carried out for display devices as disclosed in PCT International Application Publication No. WO2014/208459 listed below. This display device includes a display panel and a control device for controlling the display panel. The display panel includes a plurality of pixels. Each of the plurality of pixels includes a red subpixel, a green subpixel, and a blue subpixel. Each subpixel includes a self-luminous element such as an OLED (organic light-emitting diode) or a QLED (quantum-dot light-emitting diode) and a transistor such as a TFT (thin film transistor) for controlling the current flowing through the self-luminous element.

SUMMARY

Technical Problem

The display device disclosed in Patent Literature 1 measures the characteristics of the transistor and the characteristics of the self-luminous element. The display device hence compensates for degradation of the transistor and for degradation of the self-luminous element in accordance with changes in the characteristics of the transistor and in accordance with changes in the characteristics of the self-luminous element respectively. Specifically, the voltage applied to the transistor may be increased to compensate for a decrease in the current flowing through the transistor and/or the voltage applied to the self-luminous element may be increased to compensate for a decrease in the current flowing through the self-luminous element.

It is possible for the display device to produce a display on the basis of an input video signal while measuring the characteristics of the transistor. On the other hand, it is required to pass a current of a particular value (e.g., a current corresponding to a maximum gray level) while measuring the characteristics of the self-luminous element. Therefore, the self-luminous element is caused to emit light in a light-emitting mode (e.g., white) that differs from the light-emitting mode that is based on the input video signal. Therefore, in the technology disclosed in Patent Literature 1 listed above, the user who is watching a video being displayed on the display device inevitably has a sense of strangeness every time the characteristics of the self-luminous element are measured.

The present disclosure has been made in view of such a problem. It is an object of the present disclosure to provide a control device for a display panel, a display device, and a control method by a control device for a display panel, each of the control device, display device, and control method being capable of compensating for the degradation of the self-luminous element while reducing the frequency of causing the user to have a sense of strangeness in measuring the characteristics of the self-luminous element.

Solution to Problem

A control device for a display panel in accordance with the present disclosure includes a plurality of pixels each including: a self-luminous element; and a transistor that controls a current that flows through the self-luminous element, the control device including: a measuring unit configured to measure a luminescence characteristic of the self-luminous element and an operating characteristic of the transistor; and a correction unit configured to correct an input video signal that enables identifying a video to be displayed on the display panel, based on luminescence data related to the luminescence characteristic and operation data related to the operating characteristic, wherein the measuring unit measures the luminescence characteristic at a frequency that is lower than a frequency at which the measuring unit measures the operating characteristic.

A control method by a control device for a display panel in accordance with the present disclosure is a control method by a control device for a display panel including a plurality of pixels each including: a self-luminous element; and a transistor that controls a current that flows through the self-luminous element, the control method including: the control device measuring a luminescence characteristic of the self-luminous element and an operating characteristic of the transistor; and the control device correcting an input video signal that enables identifying a video to be displayed on the display panel, based on luminescence data related to the luminescence characteristic of the self-luminous element and operation data related to the operating characteristic of the transistor, wherein the control device measures the luminescence characteristic of the self-luminous element at a frequency that is lower than a frequency at which the control device measures the operating characteristic of the transistor.

DESCRIPTION OF EMBODIMENTS

Figure 1:
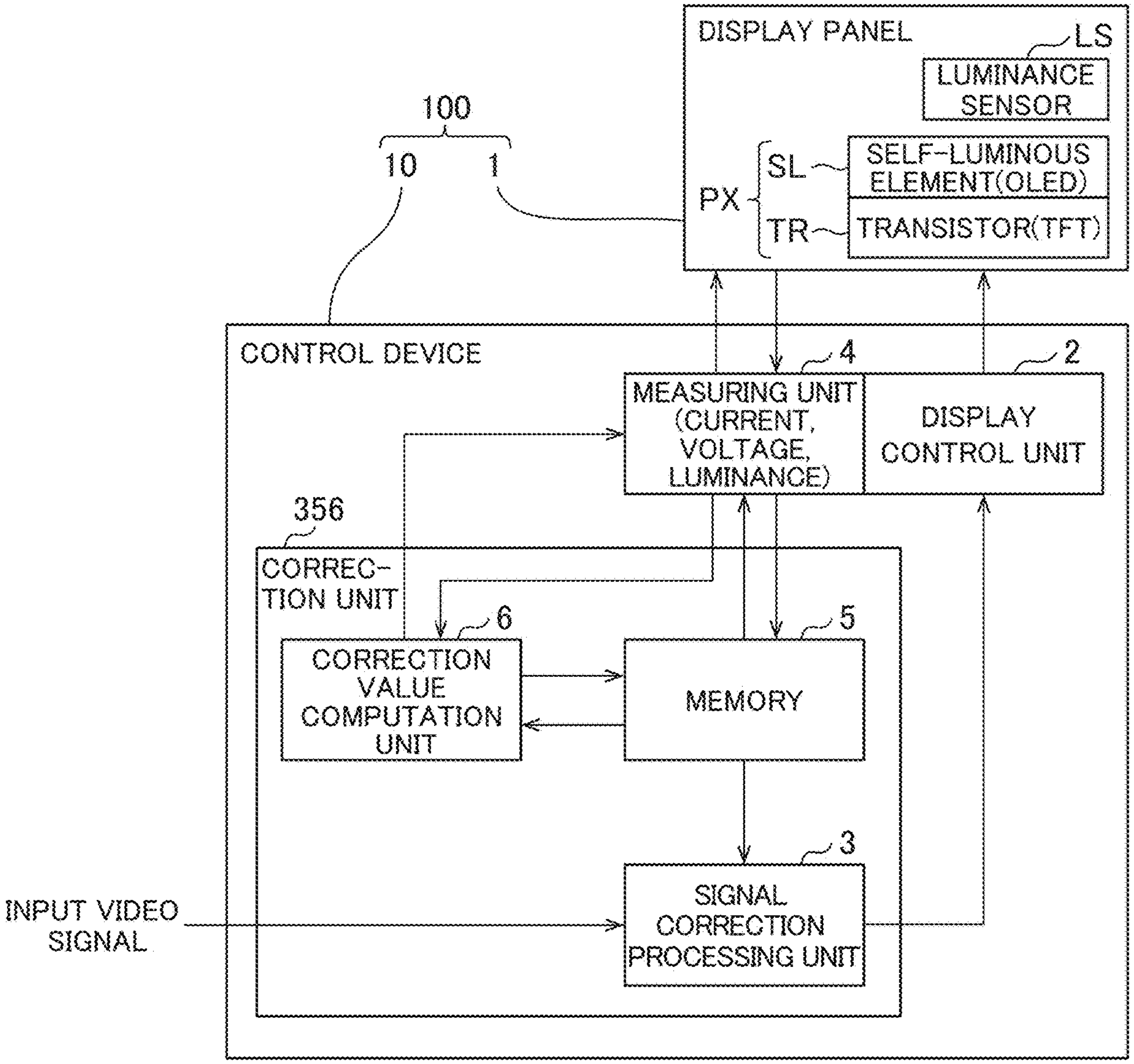
FIG. 1 is a functional block diagram of a configure of a display device in accordance with Embodiment 1.

The following will describe a control device for a display panel and a control method by a control device for a display panel each in accordance an embodiment of the present disclosure with reference to drawings. Note that identical and equivalent elements in the drawings are denoted by the same reference numerals, and description thereof is not repeated.

Embodiment 1

Referring to FIGS. 1 to 6, a description is now given of a control device 10 for a display panel 1, a display device 100, and a control method by the control device 10 for the display panel 1, each in accordance with the present embodiment.

FIG. 1 is a functional block diagram of a configure of the display device 100 in accordance with the present embodiment.

Referring to FIG. 1, the display device 100 includes the display panel 1 and the control device 10. The display panel 1 includes a plurality of pixels PX. Each of the plurality of pixels PX includes three types of subpixels (R (red), G (green), and B (blue) subpixels). Each subpixel includes a self-luminous element SL and a transistor TR for controlling the current flowing through the self-luminous element SL. The control device 10 controls the display panel 1 on the basis of a corrected input video signal.

The display panel 1 includes at least one luminance sensor LS for measuring the luminance of the self-luminous element SL. There is preferably provided a matrix of luminance sensors LS in the display panel 1. In such a case, an average value of the luminance acquired by the plurality of luminance sensors LS is used as the luminance of the display panel 1. It should be understood however that the display panel 1 may not include a luminance sensor LS. When this is the case, the luminance of the self-luminous element SL is estimated from the value of the current flowing through the self-luminous element LS, which will be detailed later.

The self-luminous element SL includes, for example, an OLED (organic light-emitting diode) or a QLED (quantum-dot light-emitting diode). The transistor TR is a TFT (thin film transistor). A pixel circuit PXC (see FIGS. 17 to 20) including the self-luminous element SL and the transistor TR will be described at the end of the present specification.

The control device 10 is implemented by, for example, a controller called a CPU (central processing unit) for performing various processes described below by means of computer programs stored therein. The control device 10 controls the video displayed on the display panel 1 by using a video input signal received from the outside. The control device 10 includes a display control unit 2, a correction unit 356, and a measuring unit 4. The display control unit 2 and the correction unit 356 are implemented by a processor for performing various processes on the basis of the aforementioned computer programs respectively and may alternatively be implemented by dedicated circuitry. Meanwhile, the measuring unit 4 is implemented by dedicated circuitry for converting an analog signal to a digital signal and may alternatively be implemented by a processor.

The display control unit 2 receives an input video signal corrected by the correction unit 356. The display control unit 2 controls the display panel 1 using the corrected input video signal. Specifically, the display control unit 2 controls the light-emitting mode of the self-luminous element SL in each subpixel in each of the pixels PX by controlling the ON/OFF operation of the transistor TR in each subpixel in each of the pixels PX.

The correction unit 356 receives an input video signal from outside the display device 100. The correction unit 356 corrects the input video signal on the basis of the value of the current flowing through the self-luminous element SL as measured by the measuring unit 4, the value of the voltage applied to the self-luminous element SL, and the value of luminance as acquired by the luminance sensor LS. In other words, the correction unit 356 corrects the input video signal that enables identifying the video to be displayed on the display panel 1, on the basis of luminescence data related to the luminescence characteristics of the self-luminous element SL and operation data related to the operating characteristics of the transistor TR for each of the aforementioned three types of subpixels. The luminescence characteristics of the self-luminous element SL include the IV characteristics (current-voltage characteristics) and the IL (injection current-light output) characteristics of the self-luminous element SL. The luminescence data includes the IV characteristics data and the IL characteristics data of the self-luminous element SL. The operation data related to the operating characteristics of the transistor TR includes the IV characteristics of the transistor TR. Then, the correction unit 356 corrects the input video signal so as to compensate for the degradation of the display panel 1. Thereafter, the correction unit 356 outputs the corrected input video signal to the display control unit 2.

The correction unit 356 includes a signal correction processing unit 3, a memory 5, and a correction value computation unit 6. The signal correction processing unit 3 corrects the input video signal received from outside the display device 100 by using at least one correction factor contained in the memory 5 and transmits the corrected input video signal to the display control unit 2.

The memory 5 contains at least one correction factor. In the present embodiment, the at least one correction factor includes three types (1) to (3) below.

(1) TFT-IV correction factors for compensating for degradation of the IV characteristics of the transistor TR (TFT)

(2) OLED-IV correction factors for compensating for degradation of the IV characteristics of the self-luminous element SL (OLED)

(3) OLED-IL correction factors for compensating for degradation of the IL characteristics of the self-luminous element SL (OLED)

The IV characteristics of the transistor TR in (1) above are an example of the operating characteristics of the transistor TR. The IV characteristics and the IL characteristics of the self-luminous element SL in (2) and (3) above are examples of the luminescence characteristics of the self-luminous element SL.

The correction value computation unit 6 transmits a signal to the measuring unit 4. Thereby, the value of the presently measured current, the value of the presently measured voltage, and the value of the presently measured luminance for each of the three types of subpixels in each of the plurality of pixels PX are acquired from the measuring unit 4. Hence, the correction value computation unit 6 calculates a new set of three types of correction factors. It should be understood however that the correction factors may be determined using a data table. In the calculation or determination of these three types of correction factors, the correction value computation unit 6 uses three types of values given in (1) to (3) below for each of the three types of subpixels in each of the plurality of pixels PX.

(1) the value of the presently measured current as acquired from the measuring unit 4

(2) the value of the presently measured voltage as acquired from the measuring unit 4

(3) the value of the presently measured luminance as acquired from the measuring unit 4

In the present embodiment, the TFT-IV correction factors are the value of slope and the value of intercept when it is assumed that the current-voltage relationship in the IV characteristics of the transistor TR is represented by a linear function. The OLED-IV correction factors are the value of slope and the value of intercept when it is assumed that the current-voltage relationship in the IV characteristics of the self-luminous element SL is represented by a linear function. The OLED-IL correction factors are the value of slope and the value of intercept when it is assumed that the current-luminance relationship in the IL characteristics of the self-luminous element SL is represented by a linear function.

For each of the three types of subpixels in each of the plurality of pixels PX, the correction value computation unit 6 stores a presently calculated, new set of three types of correction factors in the memory 5 and erases the previously stored set of three types of correction factors from the memory 5.

For each of the three types of subpixels, the measuring unit 4 acquires the value of the current flowing through the self-luminous element SL, the value of the voltage applied to the self-luminous element SL, and the value of the luminance of the self-luminous element SL as outputted by the luminance sensor LS, by transmitting a prescribed command signal to the display panel 1. In other words, the measuring unit 4 measures the luminescence characteristics of the self-luminous element SL and the operating characteristics of the transistor TR for each of the three types of subpixels in each of the plurality of pixels PX.

Figure 4:
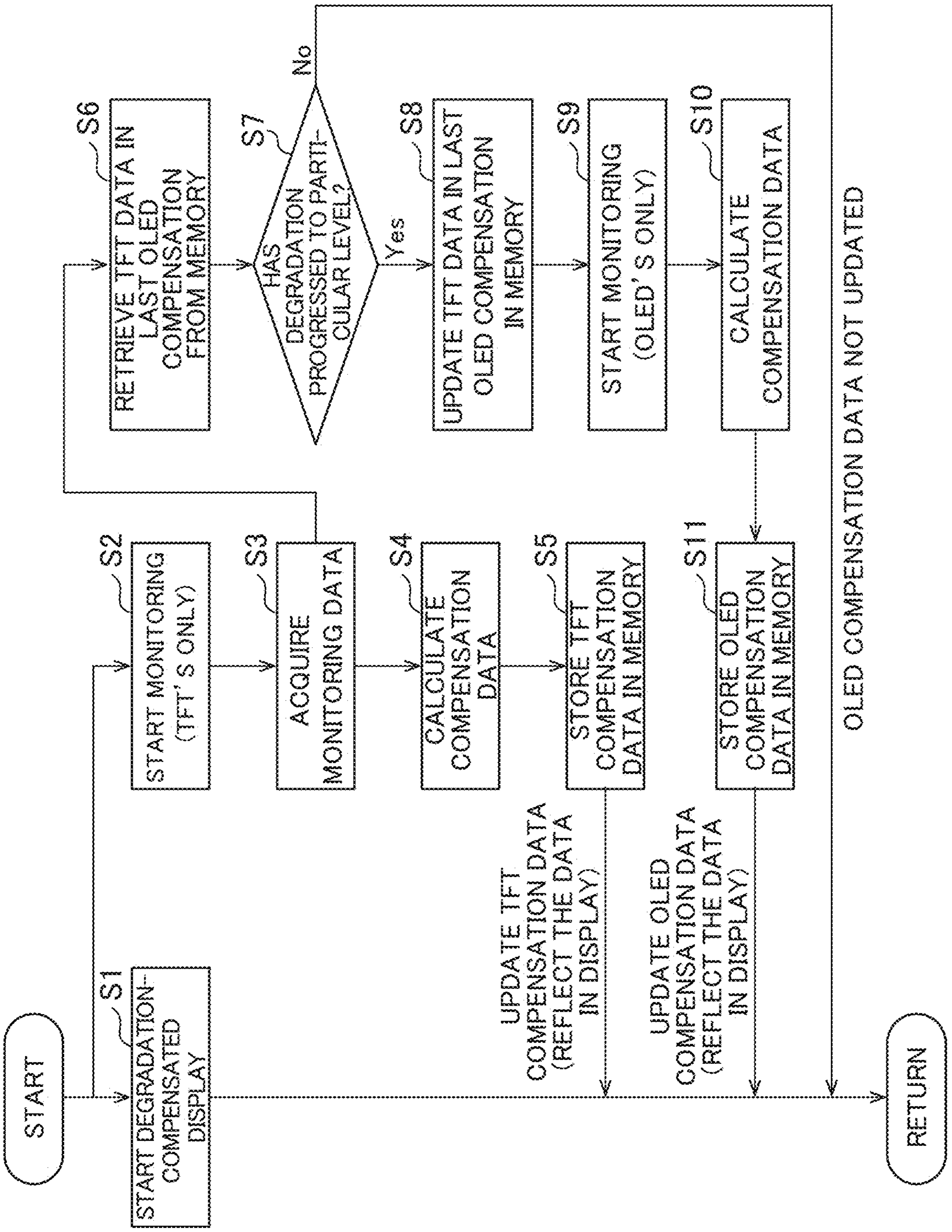
FIG. 4 is a flow chart representing a process performed by a control device in the display device in accordance with Embodiment 1.

In the present embodiment, the frequency at which the measuring unit 4 measures the luminescence characteristics of the self-luminous element SL is lower than the frequency at which the measuring unit 4 measures the operating characteristics of the transistor TR (the luminescence characteristics are measured in step S9 only if YES in step S7 in FIG. 4). Therefore, it is possible to reduce the frequency at which the self-luminous element SL emits light under a light-emitting condition that differs from the light-emitting condition produced based on an input video signal. As a result, it is possible to compensate for the degradation of the self-luminous element SL while reducing the frequency of causing the user to have a sense of strangeness in measuring the luminescence characteristics of the self-luminous element SL.

Specifically, the measuring unit 4 measures the luminescence characteristics of the self-luminous element SL for each of the plurality of subpixels in each of the plurality of pixels PX when the difference between the operation data for the transistor TR and the reference operation data for the transistor TR is greater than or equal to a prescribed value, which will be understood from steps S2, S3, S6, S7, S8, and S9 in FIG. 4 detailed later. In this configuration, the luminescence characteristics of the self-luminous element SL are not measured when the degradation of the operating characteristics of the transistor TR is small, and the luminescence characteristics of the self-luminous element SL are measured only when the degradation of the operating characteristics of the transistor TR is large. Therefore, it is possible to reduce the frequency of measuring the luminescence characteristics of the self-luminous element SL to a minimum level while retaining the function of compensating for decreases in the luminescence characteristics of the self-luminous element SL to some extent.

Furthermore, to measure the luminescence characteristics of the self-luminous element SL, the measuring unit 4 updates the reference operation data so that the operation data obtained from the present measurement of the operating characteristics of the transistor TR can be used as the reference operation data in determining whether or not the difference between the operation data and the reference operation data obtained from a next measurement is greater than or equal to a prescribed value, which will be understood from step S8 in FIG. 4 detailed later. In this configuration, it is possible to increase the precision of compensation for the degradation of the self-luminous element SL.

Figure 2:
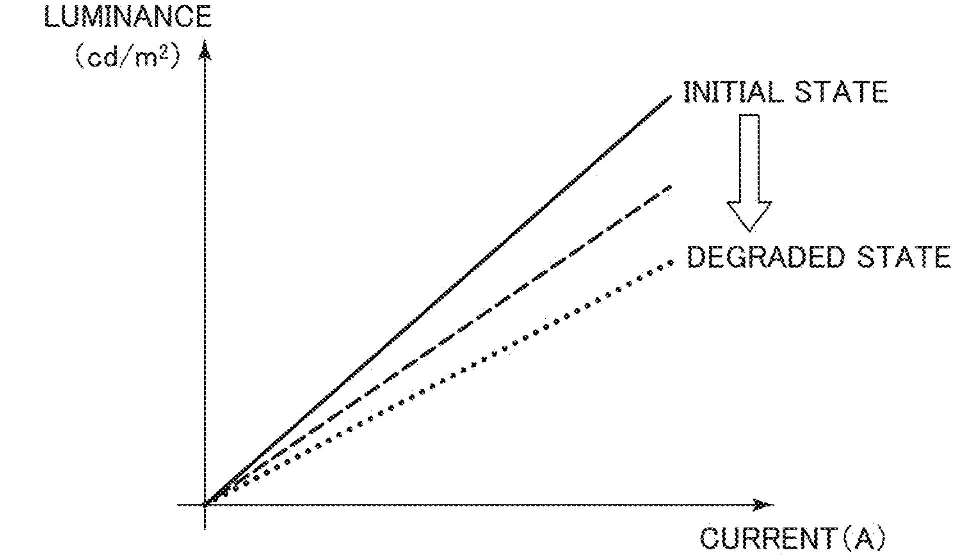
FIG. 2 is a graph representing the relationship between the current flowing through a self-luminous element and the luminance of the self-luminous element, the relationship changing with an increase in the usage time of the display panel.

FIG. 2 is a graph representing the relationship between the current flowing through the self-luminous element SL and the luminance of the self-luminous element SL, the relationship changing with an increase in the usage time of the display panel 1. FIG. 2 shows that the luminous efficiency of the self-luminous element SL gradually degrades with an increase in the usage time of the display panel 1. In other words, it would be understood that a larger current needs to be passed through the self-luminous element SL to obtain the same luminance from the emission of light by the self-luminous element SL as the usage time of the display panel 1 increases.

Figure 3:
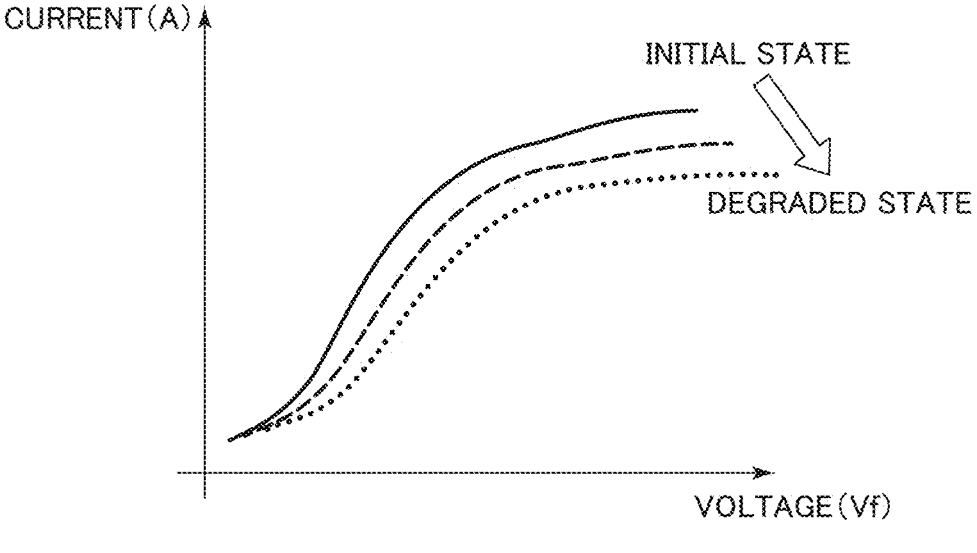
FIG. 3 is a graph representing the relationship between the voltage applied to the self-luminous element and the current flowing through the self-luminous element, the relationship changing with an increase in the usage time of the display panel.

FIG. 3 is a graph representing the relationship between the voltage applied to the self-luminous element SL and the current flowing through the self-luminous element SL, the relationship changing with an increase in the usage time of the display panel 1. FIG. 3 shows that the electrical characteristics of the self-luminous element SL, specifically, the IV characteristics of the self-luminous element SL, gradually degrade with an increase in the usage time of the display panel 1. In other words, it would be understood that a larger voltage needs to be applied to the self-luminous element SL to pass the same current through the self-luminous element SL as the usage time of the display panel 1 increases.

From FIGS. 2 and 3, it is understood that the degradation quantity of the electrical characteristics of the self-luminous element SL is correlated to the degradation quantity of the luminous efficiency of the self-luminous element SL. Therefore, it would be possible to estimate the degradation quantity of the luminous efficiency of the self-luminous element SL from the degradation quantity of the electrical characteristics (e.g., the degradation quantity of the IV characteristics) of the self-luminous element SL. Accordingly, the value of the luminance of the self-luminous element SL may be determined from the measured value of the current of the self-luminous element SL by using a data table representing the IL characteristics relationship of the self-luminous element SL obtained by measurement in advance if no luminance sensor LS is used.

FIG. 4 is a flow chart representing a process performed by the control device 10 in the display device 100 in accordance with the present embodiment.

In step S1, the control device 10 starts a process of compensating for degradation of the display panel 1. Specifically, the signal correction processing unit 3 in the correction unit 356 corrects the input video signal received from outside the display device 100 and transmits the corrected input video signal to the display control unit 2. Hence, the display control unit 2 controls the display state of the display panel 1 by using the corrected input video signal. In parallel to step S1, the control device 10 performs the process of steps S2 to S11.

First, in step S2, the control device 10 starts monitoring the display panel 1. Specifically, the measuring unit 4 starts measuring the value of the voltage applied to the transistor TR and the value of the current flowing through the transistor TR. Hence, in step S3, the control device 10 acquires monitoring data. In other words, in step S3, the correction value computation unit 6 acquires data on the operating characteristics, specifically, on the IV characteristics, of the transistor TR from the value of the voltage applied to the transistor TR and the value of the current flowing through the transistor TR both as measured by the measuring unit 4. The value of the voltage applied to the transistor TR is acquired at a non-emission timing for the self-luminous element SL that falls between timings at which the self-luminous element SL is caused to emit light in the light-emitting mode based on the gray level of the self-luminous element SL contained in the input video signal. The value of the current flowing through the transistor TR is also acquired at a non-emission timing for the self-luminous element SL that falls between timings at which the self-luminous element SL is caused to emit light in the light-emitting mode based on the gray level of the self-luminous element SL contained in the input video signal. Therefore, since the self-luminous element SL does not need to be caused to emit light to acquire the operating characteristics of the transistor TR, the operating characteristics of the transistor TR can be measured without the user having to have a sense of strangeness.

In step S4, the correction value computation unit 6 calculates compensation data. Specifically, the correction value computation unit 6 calculates the TFT-IV correction factors by using data on the IV characteristics of the transistor TR, in other words, the value of the voltage and the value of the current for the transistor TR as measured by the measuring unit 4. Thereafter, in step S5, the correction value computation unit 6 stores the calculated TFT-IV correction factors in the memory 5 and erases the TFT-IV correction factors previously stored in the memory 5 from the memory 5. In other words, the correction value computation unit 6 updates the TFT-IV correction factors stored in the memory 5. Hence, the signal correction processing unit 3 corrects the input video signal using the updated TFT-IV correction factors and transmits the corrected input video signal to the display control unit 2. As a result, the display panel 1 displays a video corresponding to the input video signal that reflects the updating of the TFT-IV correction factors. Therefore, the compensation for the degradation of the IV characteristics of the transistor TR is more suitably performed.

In parallel to the process of steps S4 and S5, the control device 10 performs a process of steps S6 to S11.

In step S6, the correction value computation unit 6 reads out the operation data, in other words, the data on the IV characteristics, of the transistor TR as of the last compensation for the degradation of the self-luminous element SL from the memory 5. This operation data for the transistor TR stored in the memory 5 in the last compensation for the degradation of the self-luminous element SL is the aforementioned reference operation data. Thereafter, in step S7, it is determined whether or not the IV characteristics of the transistor TR have degraded by at least a prescribed value. Specifically, in step S7, the correction value computation unit 6 compares the data on the IV characteristics of the transistor TR acquired from the measuring unit 4 in step S3 with the data on the IV characteristics of the transistor TR read out from the memory 5 in step S6. In other words, in step S7, the correction value computation unit 6 compares the data on the presently measured IV characteristics of the transistor TR and the data on the last measured IV characteristics of the transistor TR.

If it is determined as a result of this comparison that the data on the presently measured IV characteristics of the transistor TR has degraded by at least the prescribed value over the data on the last measured IV characteristics of the transistor TR, the correction value computation unit 6 performs the process of step S8. On the other hand, there are times when it is not determined that the data on the presently measured IV characteristics of the transistor TR has degraded by at least the prescribed value over the data on the last measured IV characteristics of the transistor TR. In such cases, the control device 10 repeats the process of steps S1, S2, S3, S6, and S7 without performing the process of steps S6 to S11. In other words, the control device 10 performs the process of step S1 without updating OLED correction data, in other words, without updating the OLED-IV correction factors and the OLED-IL correction factors.

In step S8, the correction value computation unit 6 updates the operation data, in other words, the reference operation data, for the transistor TR (TFT) as of the last OLED compensation in the memory 5. In other words, the correction value computation unit 6 erases the data on the last measured IV characteristics of the transistor TR from the memory 5. Then, the correction value computation unit 6 stores the new operation data for the transistor TR as measured in step S3 in the memory 5. Thereafter, in step S9, the measuring unit 4 performs only the measurement of the luminescence characteristics of the self-luminous element SL and transmits the measured luminescence data for the self-luminous element SL, in other words, the value of the current, the value of the voltage, and the value of the luminance for the OLED to the correction value computation unit 6.

In step S10, the correction value computation unit 6 calculates the OLED-IV correction factors and the OLED-IL correction factors on the basis of the luminescence data of the self-luminous element SL received from the measuring unit 4. These correction factors may be determined using a data table. Thereafter, in step S11, the correction value computation unit 6 stores the OLED-IV correction factors and the OLED-IL correction factors, both either calculated or determined, in the memory 5 and erases the OLED-IV correction factors and the OLED-IL correction factors stored in the memory 5 from the memory 5. In other words, the correction value computation unit 6 updates the OLED-IV correction factors and the OLED-IL correction factors both of which are compensation data.

Hence, the signal correction processing unit 3 corrects the input video signal using the updated OLED-IV correction factors and the updated OLED-IL correction factors and transmits the corrected input video signal to the display control unit 2. As a result, the display panel 1 displays a video that reflects the updating of the OLED-IV correction factors and the OLED-IL correction factors. Therefore, the compensation for the degradation of both the IV characteristics and the IL characteristics of the self-luminous element SL is more suitably performed.

In this process performed by the control device 10, the measurement of the luminescence characteristics of the self-luminous element SL in step S9 is not performed if it is not determined in step S7 that the operating characteristics (IV characteristics) of the transistor TR have degraded at least to some extent. Therefore, the frequency of measuring the luminescence characteristics is lower than the frequency of measuring the operating characteristics. As a result, it is possible to compensate for the degradation of the self-luminous element SL while reducing the frequency of causing the user who is watching the video displayed by the display device 100 to have a sense of strangeness in measuring the luminescence characteristics of the self-luminous element SL.

Figure 5:
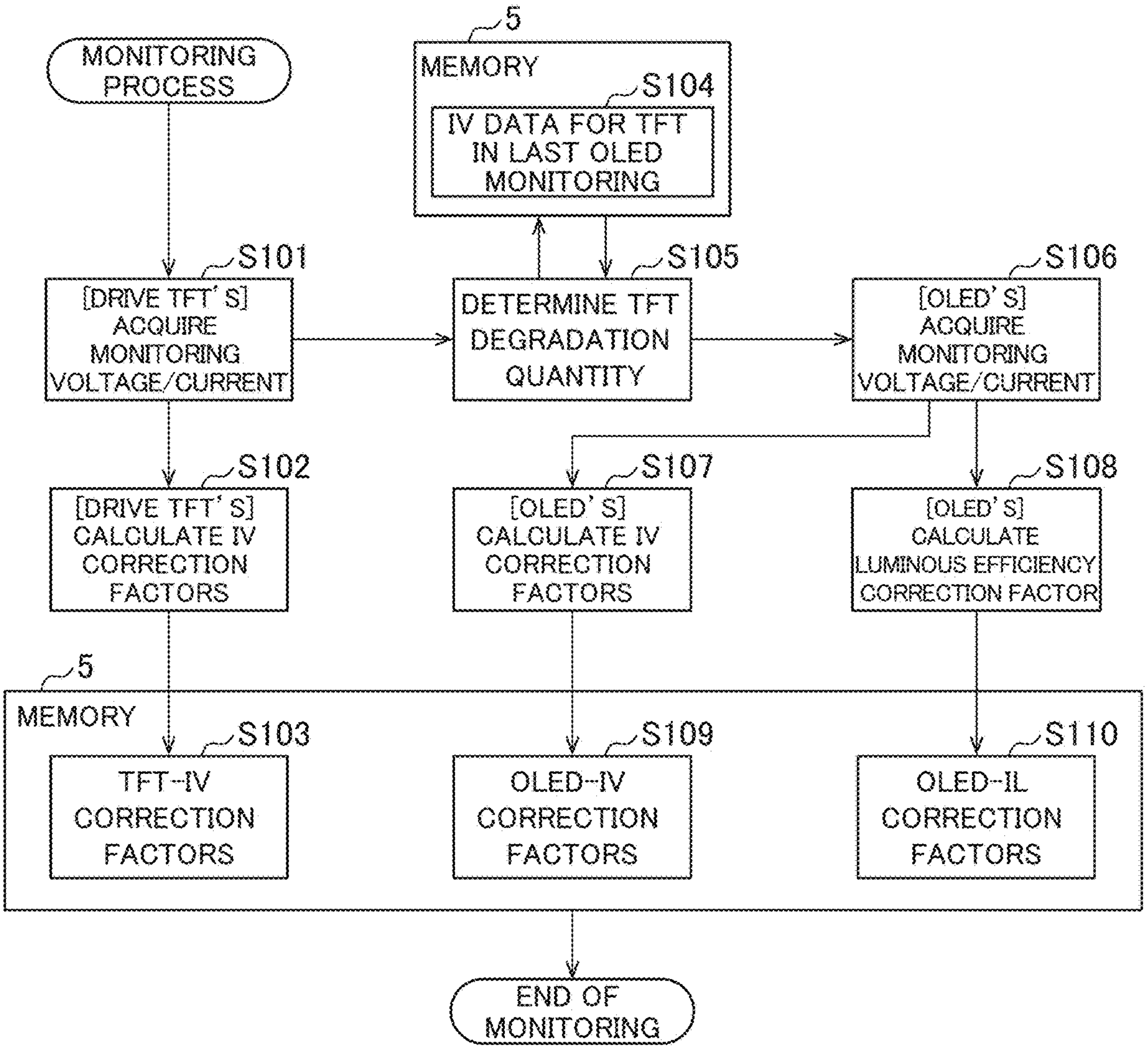
FIG. 5 is a flow chart representing a first process performed by a correction unit in the control device in the display device in accordance with Embodiment 1.

FIG. 5 is a flow chart representing a first process performed by the correction unit 356 in the control device 10 in the display device 100 in accordance with the present embodiment.

In step S101, the correction value computation unit 6 acquires, from the measuring unit 4, the value of the current and the value of the voltage for the transistor TR in each of the three types of subpixels in each of the plurality of pixels PX and generates data on the IV characteristics of the transistor TR. Next, in step S102, the correction value computation unit 6 calculates TFT-IV correction factors of each of the plurality of transistors TR by using IV characteristics data for each of the plurality of transistors TR. In the present embodiment, the correction value computation unit 6 calculates the slope and intercept of the IV characteristics of the transistor TR represented by a linear function. Thereafter, in step S103, the correction value computation unit 6 stores the TFT-IV correction factors for each of the plurality of pixels PX in the memory 5.

In addition, the correction value computation unit 6, in step S104, reads out the data on the IV characteristics of the transistor TR that is contained in the memory 5 as a result of the last measurement made by the measuring unit 4. In step S105, the correction value computation unit 6 compares the data on the IV characteristics of the transistor that is contained in the memory 5 as a result of the last measurement made by the measuring unit 4 with the data on the IV characteristics of the transistor TR that is obtained as a result of the present measurement made by the measuring unit 4.

Hence, if it is determined in step S105 that the degradation quantity of the IV characteristics of the transistor TR is greater than or equal to a prescribed value, the correction value computation unit 6, in step S106, causes each of the plurality of self-luminous elements SL to emit light in a prescribed light-emitting mode onto the measuring unit 4. Then, the correction value computation unit 6 causes the measuring unit 4 to acquire data on the IV characteristics and data on the luminance of the self-luminous element SL in each of the three types of subpixels in each of the plurality of pixels PX. Specifically, the correction value computation unit 6 acquires data on the value of the current, the value of the voltage, and the luminance for the self-luminous element SL as measured by the measuring unit 4.

In step S107, the correction value computation unit 6 calculates the OLED-IV correction factors of the self-luminous element SL by using the value of the current and the value of the voltage for the self-luminous element SL. In the present embodiment, the correction value computation unit 6 calculates the slope and intercept of the IV characteristics of the self-luminous element SL represented by a linear function. In addition, in step S108, the correction value computation unit 6 calculates the OLED-IL correction factors of the self-luminous element SL for each of the plurality of pixels PX by using the data on the luminance of the self-luminous element SL in each of the plurality of pixels PX. In the present embodiment, the correction value computation unit 6 calculates the slope and intercept of the IL characteristics of the self-luminous element SL represented by a linear function.

Thereafter, in step S109, the correction value computation unit 6 causes the memory 5 to store the OLED-IV correction factors calculated in step S7. In step S110, the correction value computation unit 6 causes the memory 5 to store the OLED-IL correction factors calculated in step S108.

On the other hand, if it is not determined in step S105 that the degradation quantity of the IV characteristics of the transistor TR is greater than or equal to the prescribed value, the correction value computation unit 6 does not perform the process of steps S106 to S110.

Figure 6:
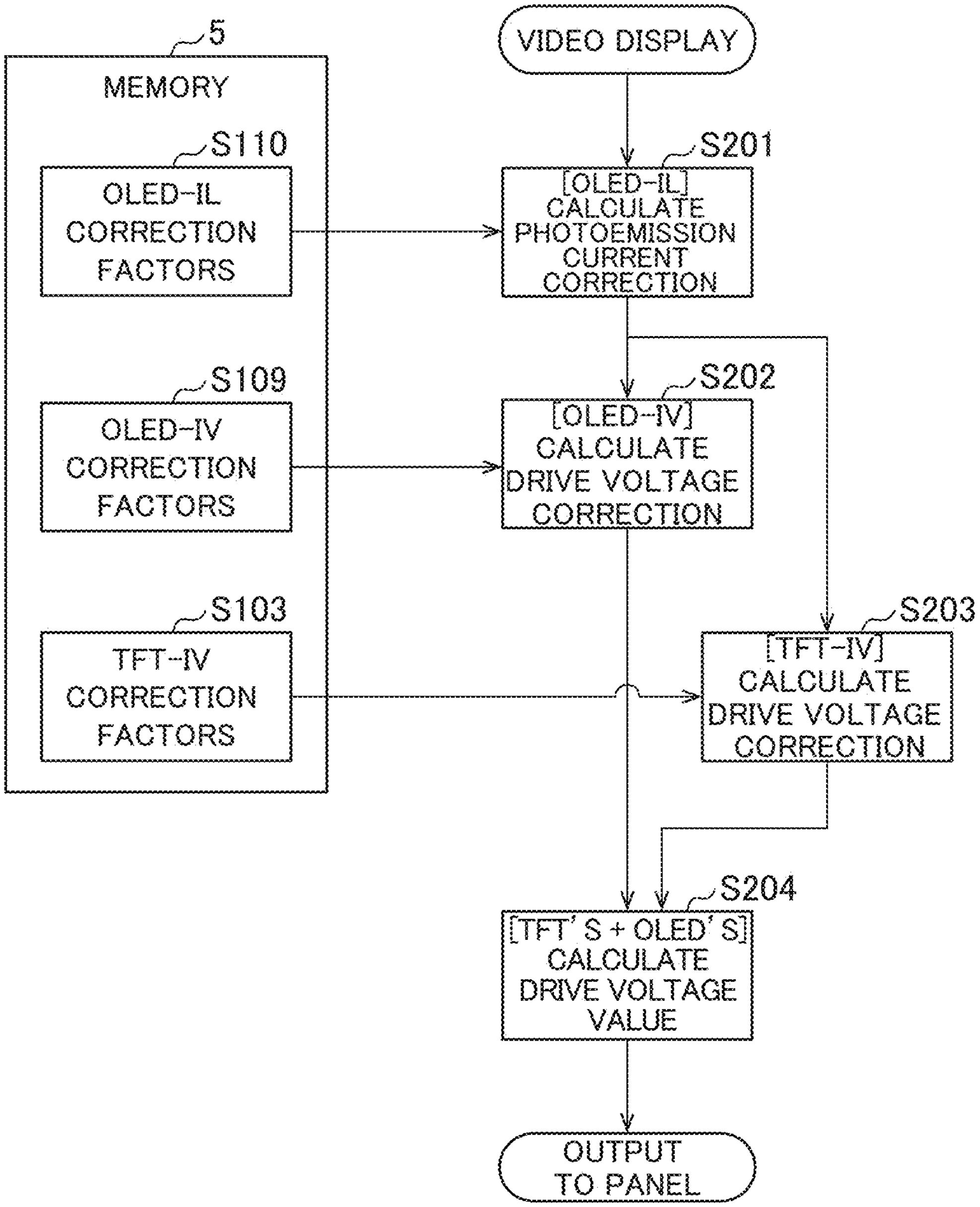
FIG. 6 is a flow chart representing a second process performed by the correction unit in the control device in the display device in accordance with Embodiment 1.

FIG. 6 is a flow chart representing a second process performed by the correction unit 356 in the control device 10 in the display device 100 in accordance with the present embodiment.

In step S201, the signal correction processing unit 3 calculates a correction value for the current for each of the plurality of self-luminous elements SL by using the OLED-IL correction factors of each of the plurality of self-luminous elements SL that are contained in the memory 5. In step S202, the signal correction processing unit 3 calculates a correction value for the voltage that should be applied to pass a current of the corrected value through each of the plurality of self-luminous elements SL by using the OLED-IV correction factors of each of the plurality of self-luminous elements SL that are contained in the memory 5.

In addition, in step S203, the signal correction processing unit 3 calculates a correction value for the voltage that should be applied across the gate and source of each of the plurality of transistors TR by using the TFT-IV correction factors of the plurality of transistors TR that are contained in the memory 5. Thereafter, in step S204, the signal correction processing unit 3 calculates a drive voltage value that is a sum of the voltage that should be applied across the gate and source of the transistor TR and the voltage that should be applied to the self-luminous element SL for each of the plurality of subpixels. Thereafter, the display control unit 2 receives the sum drive voltage value from the signal correction processing unit 3 and controls the display panel 1 so that the voltage corresponding to the sum drive voltage value is applied to the transistor TR and the self-luminous element SL in each of the plurality of subpixels. The reasons why the drive voltage value is calculated that is a sum of the voltage that should be applied across the gate and source of the transistor TR and the voltage that should be applied to the self-luminous element SL as described here will be described also in the description given below in relation to FIG. 18.

Note that, in the present embodiment, measurement and compensation are performed for the level of the degradation of each self-luminous element SL in the entire display panel 1. However, measurement and compensation may be sequentially performed for the degradation of the self-luminous element SL only in parts where the level of degradation of the display panel 1 is estimated to be large from the level of the degradation of the transistor TR.

Note that the value "calculated" by the computation may be determined using a data table prepared from results of measurements performed in advance.

Embodiment 2

Figure 7:
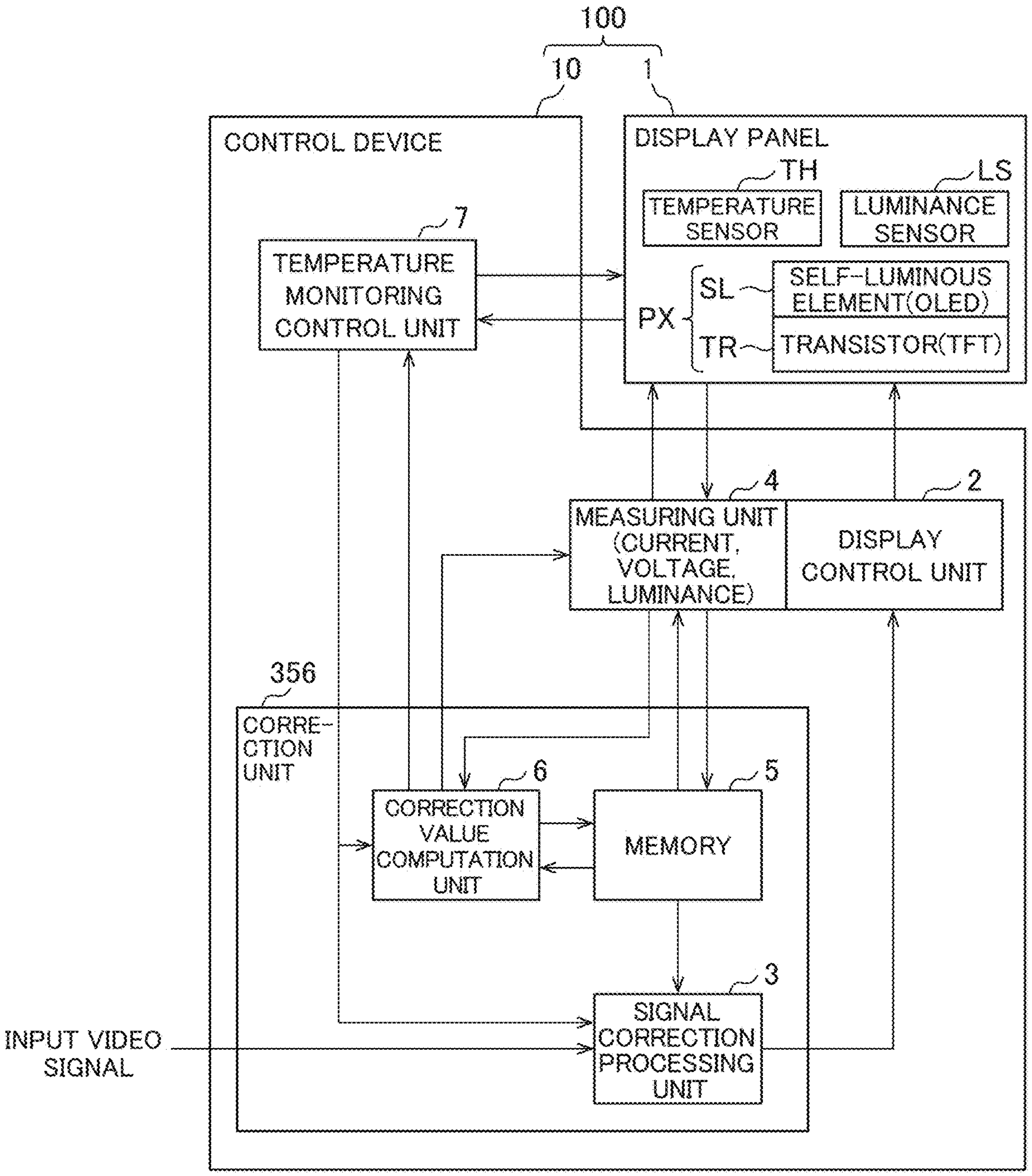
FIG. 7 is a functional block diagram of a structure of a display device in accordance with Embodiment 2.
Figure 8:
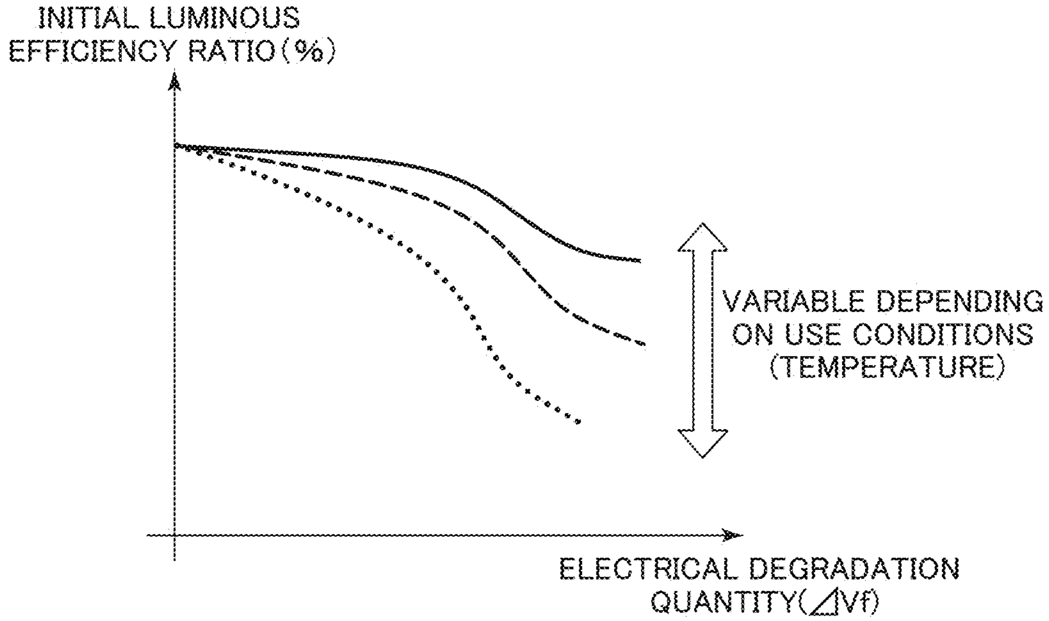
FIG. 8 is a graph representing the relationship between the electrical degradation quantity of a self-luminous element and the degradation quantity of the luminous efficiency of the self-luminous element, the relationship varying depending on temperature conditions.
Figure 9:
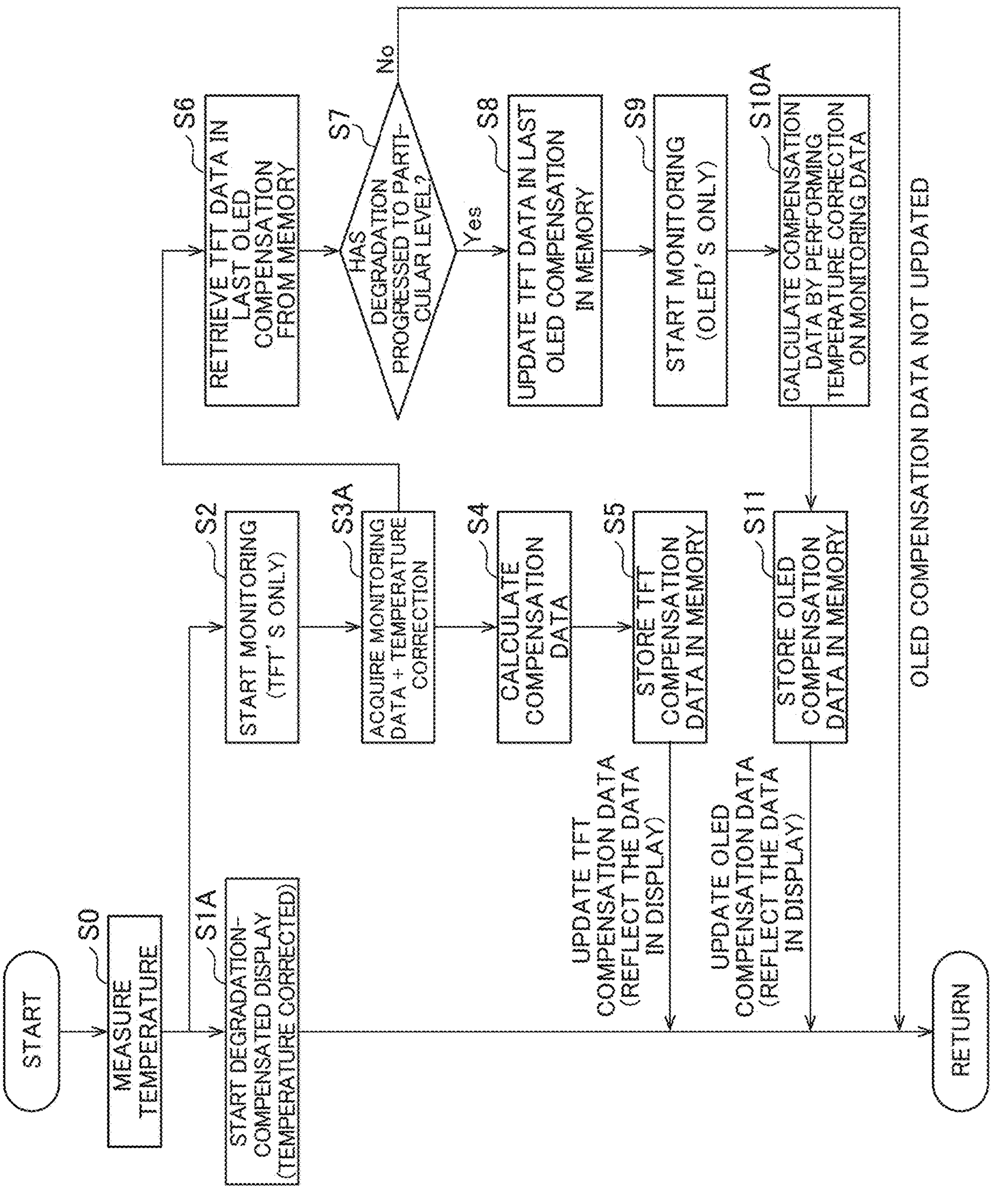
FIG. 9 is a flow chart representing a process performed by a control device in the display device in accordance with Embodiment 2.

Referring to FIGS. 7 to 9, a description is now given of a control device for a display panel and a control method by a control device for a display panel in accordance with Embodiment 2. Note that description of the members and features that are similar to a control device for a display panel and a control method by a control device for a display panel in accordance with an embodiment will not be repeated in the following. The control device for a display panel and the control method by a control device for a display panel in accordance with the present embodiment differ from the control device for a display panel and the control method by a control device for a display panel in accordance with Embodiment 1 in the following respects.

FIG. 7 is a functional block diagram of a structure of a display device 100 in accordance with the present embodiment.

The display device 100 in accordance with the present embodiment further includes a temperature sensor TH for measuring the temperature of the display panel 1 in addition to the structure of the display device 100 in accordance with Embodiment 1. The display device 100 may include a single temperature sensor TH and may include a plurality of temperature sensors TH. When the display device 100 includes a plurality of temperature sensors TH, the average of the values obtained from the plurality of temperature sensors TH may be used as temperature data. Note that the plurality of temperature sensors TH are preferably arranged in a matrix in a display area of the display panel 1.

The control device 10 in accordance with the present embodiment further includes a temperature monitoring control unit 7 for acquiring temperature data obtained by the temperature sensor TH and transmitting the acquired temperature data to the correction value computation unit 6 and the signal correction processing unit 3 in addition to the structure of the control device 10 in accordance with Embodiment 1. In the present embodiment, the correction unit 356 corrects an input video signal on the basis of the temperature data for the display panel 1 as measured by the temperature sensor TH and also on the basis of the luminescence data and the operation data described in Embodiment 1 and thereafter outputs the corrected input video signal to the display panel 1. In this configuration, it is possible to suitably compensate for the degradation of the self-luminous element SL and the transistor TR in accordance with variations in the level of the degradation attributable to temperature conditions for the display panel 1.

FIG. 8 is a graph representing the relationship between the electrical degradation quantity (degradation quantity of the operating characteristics) of the self-luminous element SL and the degradation quantity of the luminous efficiency of the self-luminous element SL, the relationship varying depending on temperature conditions. Of the three lines drawn in FIG. 8, the bottom line represents a case with a high temperature, the second bottom line represents a case with an intermediate temperature, and the top solid line represents a case with a low temperature. It is understood from FIG. 8 that the luminous efficiency of the self-luminous element SL decreases with a rise in the temperature of the display panel 1. It is also understood from FIG. 8 that the luminous efficiency of the self-luminous element SL degrades more quickly at higher temperature.

FIG. 9 is a flow chart representing a process performed by the control device 10 in the display device 100 in accordance with the present embodiment.

Referring to FIG. 9, in the present embodiment, in step S0, the control device 10 causes the temperature sensor TH and the temperature monitoring control unit 7 to start a process of acquiring temperature data on the display panel 1. Hence, the temperature data of the display panel 1 acquired by the temperature sensor TH is transmitted to the correction value computation unit 6 and the signal correction processing unit 3 via the temperature monitoring control unit 7.

The control device 10, in step SA1, causes the display panel 1 to start producing a display while performing degradation compensation control in accordance with changes in the temperature conditions.

In step S3A, the control device 10 acquires monitoring data for the transistor TR and performs a correction based on a temperature. Specifically, in step S3A, the correction value computation unit 6 acquires data on the IV characteristics of the transistor TR as measured by the measuring unit 4. In addition, in step S3A, the correction value computation unit 6 corrects the TFT-IV correction factors of the transistor TR by using the temperature data for the display panel 1 measured by the temperature sensor TH. In other words, the TFT-IV correction factors for compensation for the degradation of the transistor TR are calculated as correction factors at a prescribed temperature with differences in the temperature conditions for the display panel 1 being corrected.

In step S10A, the control device 10 acquires monitoring data for the self-luminous element SL and also performs a temperature correction to calculate compensation data. Specifically, in step S10A, the correction value computation unit 6 acquires data on the IV characteristics and data on the IL characteristics of the self-luminous element SL as measured by the measuring unit 4. In addition, in step S10A, the correction value computation unit 6 corrects the OLED-IV correction factors and OLED-IL correction factors of the self-luminous element SL by using the temperature data of the display panel 1 measured by the temperature sensor TH. In other words, data on compensation for the degradation of the self-luminous element SL is calculated as correction factors at a prescribed temperature with differences in the temperature conditions for the display panel 1 being corrected.

The control device 10 can change the level of the compensation for the degradation of the transistor TR and the self-luminous element SL in accordance with the temperature data of the display panel 1 acquired by the temperature sensor TH and also in accordance with the luminescence data and operation data measured by the measuring unit 4. Therefore, the compensation for the degradation of the transistor TR and the self-luminous element SL can be more suitably performed.

Embodiment 3

Figure 10:
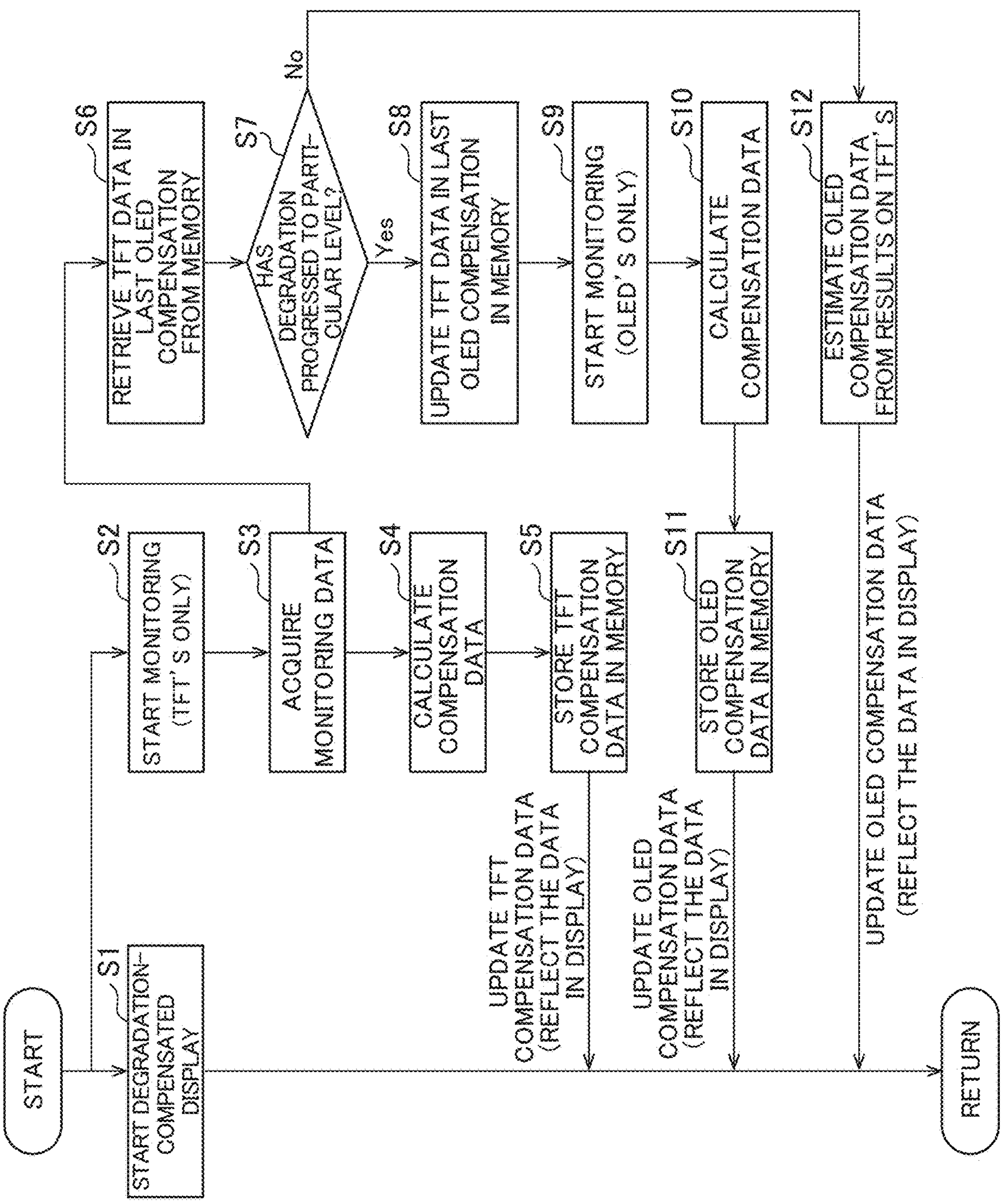
FIG. 10 is a flow chart representing a process performed by a control device in a display device in accordance with Embodiment 3.

Referring to FIG. 10, a description is now given of a control device for a display panel and a control method by a control device for a display panel in accordance with Embodiment 3. Note that description of the members and features that are similar to a control device for a display panel and a control method by a control device for a display panel in accordance with an embodiment will not be repeated in the following. The control device for a display panel and the control method by a control device for a display panel in accordance with the present embodiment differ from the control device for a display panel and the control method by a control device for a display panel in accordance with Embodiment 1 or 2 in the following respects.

FIG. 10 is a flow chart representing a process performed by the control device 10 in the display device 100 in accordance with the present embodiment.

Referring to FIG. 10, the correction value computation unit 6 in the correction unit 356, when the level of the degradation of the transistor TR is less than a prescribed value in step S7, estimates, in step S12, degradation compensation data on the basis of the operation data for the transistor TR as of the last compensation for the degradation of the self-luminous element SL stored in the memory 5 and on the basis of the results of the present measurement of the operating characteristics of the transistor TR as measured in step S3. Specifically, the correction value computation unit 6, when the difference between the operation data for the transistor TR and the reference operation data for the transistor TR is less than a prescribed value in step S7, obtains, in step S12, a degradation quantity of the transistor TR from the operation data for the transistor TR as of the last compensation for the degradation of the self-luminous element SL stored in the memory 5 and also from the present operation data for the transistor TR measured in step S3. Then, the correction value computation unit 6 estimates the luminescence characteristics of the self-luminous element SL on the basis of the degradation quantity of the transistor TR, with the degradation that occurred after the last compensation for the degradation of the self-luminous element SL being taken into account. Hence, the correction value computation unit 6 performs control for compensating for the degradation of the self-luminous element SL on the basis of the estimated luminescence characteristics of the self-luminous element SL. In other words, it is possible to perform the compensation for the degradation of the self-luminous element SL on the basis of the results of the measurement of the operating characteristics of the transistor TR even during a period in which the characteristics of the luminescence characteristics of the self-luminous element SL are not being measured. As a result, the compensation for the degradation of the self-luminous element SL can be more suitably performed.

Embodiment 4

Figure 11:
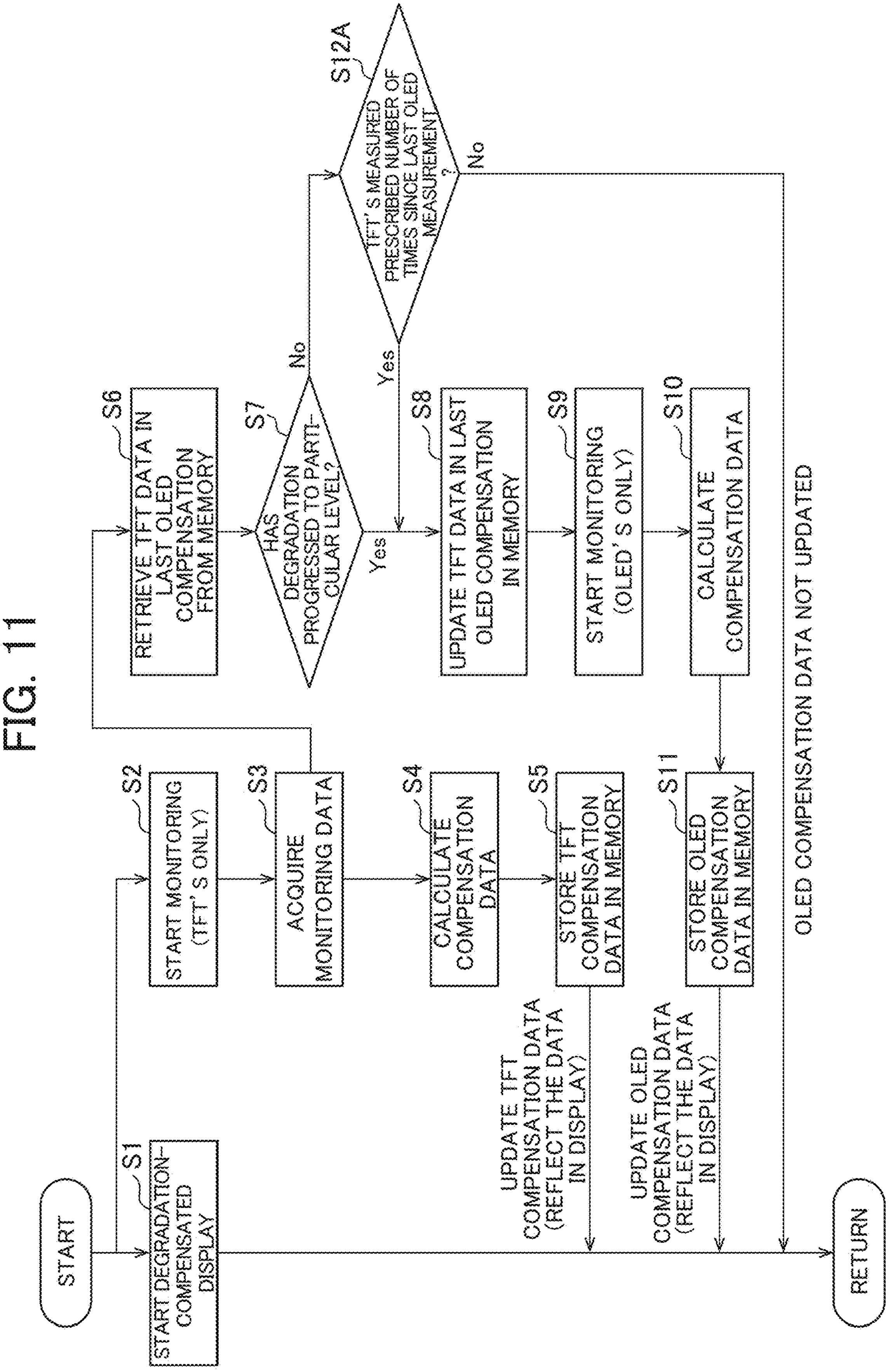
FIG. 11 is a flow chart representing a process performed by a control device in a display device in accordance with Embodiment 4.

Referring to FIG. 11, a description is now given of a control device for a display panel and a control method by a control device for a display panel in accordance with Embodiment 4. Note that description of the members and features that are similar to a control device for a display panel and a control method by a control device for a display panel in accordance with an embodiment will not be repeated in the following. The control device for a display panel and the control method by a control device for a display panel in accordance with the present embodiment differ from the control device for a display panel and the control method by a control device for a display panel in accordance with Embodiments 1 to 3 in the following respects.

FIG. 11 is a flow chart representing a process performed by the control device 10 in the display device 100 in accordance with the present embodiment.

Referring to FIG. 11, the correction value computation unit 6 in the correction unit 356, when the level of the degradation of the transistor TR is less than a prescribed value in step S7, determines in step S12A whether or not the number of times of measurement on the transistor TR (TFT) has reached a prescribed number of times since the last measurement on the self-luminous element SL. Hence, if the number of times of measurement of the operating characteristics of the transistor TR (TFT) has reached the prescribed number of times since the last measurement on the self-luminous element SL, the process of steps S8 to S11 is performed. Hence, the measurement of the luminescence characteristics and operating characteristics of the self-luminous element SL and the compensation for the degradation of the self-luminous element SL can be performed. If, in step S12A, the number of times of measurement of the operating characteristics of the transistor TR (TFT) has reached a prescribed number of times since the last measurement on the self-luminous element SL, the correction value computation unit 6 updates OLED compensation data, that is, the OLED-IV correction factors and the OLED-IL correction factors. On the other hand, if, in step S12A, the number of times of measurement of the operating characteristics of the transistor TR (TFT) has not reached the prescribed number of times since the last measurement on the self-luminous element SL, the correction value computation unit 6 does not update the OLED compensation data. In other words, if, step S12A, the number of times of measurement of the operating characteristics of the transistor TR (TFT) has not reached the prescribed number of times since the last measurement on the self-luminous element SL, the correction value computation unit 6 dose not update the OLED-IV correction factors and the OLED-IL correction factors.

The degradation of the transistor TR and the degradation of the self-luminous element SL do not always progress in the same manner. For example, the degradation of the self-luminous element SL could grow large, with an increase in the usage time of the display panel 1, relative to the degradation of the transistor TR. In such cases, if the threshold value for performing a determination whether or not the degradation of the transistor TR has reached a prescribed value is constant, the degradation of the self-luminous element SL could have already progressed significantly when the measurement of the luminescence characteristics and operating characteristics of the self-luminous element SL is started. In other words, the degradation of the image quality of the display panel 1 could persist for an extended period of time. The number of times that the operating characteristics of the transistor TR are measured could have reached a prescribed number of times or higher also when the difference between the operation data and reference operation data for the transistor TR is less than a prescribed value in step S12A. In such cases, the measuring unit 4 measures the luminescence characteristics of the self-luminous element SL in step S9. In other words, even if the level of the degradation of the transistor TR has not reached a prescribed value, the measuring unit 4 performs measurement of the luminescence characteristics of the self-luminous element SL when the number of times of measurement of the operating characteristics of the transistor TR has reached a prescribed number of times or higher. Therefore, it is possible to restrain the degradation of the self-luminous element SL from progressing significantly during a period in which the degradation of the transistor TR does not progress.

Embodiment 5

Referring to FIGS. 12 to 16, a description is now given of a control device for a display panel and a control method by a control device for a display panel in accordance with Embodiment 5. Note that description of the members and features that are similar to a control device for a display panel and a control method by a control device for a display panel in accordance with an embodiment will not be repeated in the following. The control device for a display panel and the control method by a control device for a display panel in accordance with the present embodiment differ from the control device for a display panel and the control method by a control device for a display panel in accordance with Embodiments 1 to 4 in the following respects.

Figure 12:
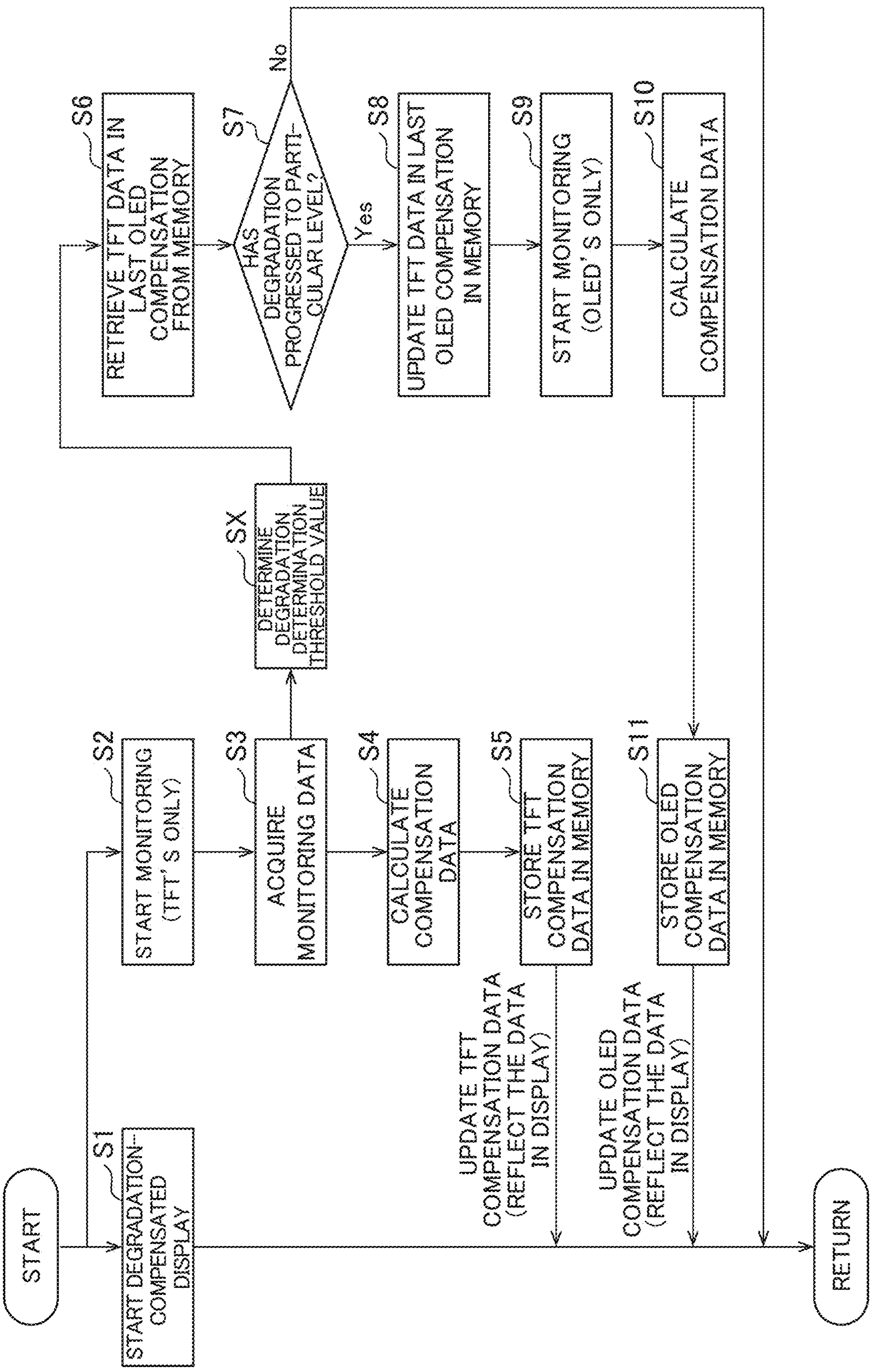
FIG. 12 is a flow chart representing a process performed by a control device in a display device in accordance with Embodiment 5.

FIG. 12 is a flow chart representing a process performed by the control device 10 in the display device 100 in accordance with the present embodiment.

As described earlier, the degradation of the transistor TR and the degradation of the self-luminous element SL do not always progress in the same manner. For example, the following two cases (1) and (2) are possible.

(1) A case where, in one subpixel, the level of the degradation of the self-luminous element SL grows large relative to the level of the degradation of the transistor TR as the degradation of the transistor TR progresses.

In this case, as the degradation of the transistor TR progresses, the degradation of the image quality of the display panel 1 has persisted for an extended period of time due to the level of the degradation of the self-luminous element SL that has already grown when the measurement of the luminescence characteristics and operating characteristics of the self-luminous element SL is started.

(2) A case where, in one subpixel, the level of the degradation of the self-luminous element SL grows small relative to the level of the degradation of the transistor TR as the degradation of the transistor TR progresses.

In this case, as the degradation of the transistor TR progresses, it follows that the luminescence characteristics and operating characteristics of the self-luminous element SL are measured to no avail when the measurement of the luminescence characteristics and operating characteristics of the self-luminous element SL is started, because the level of the degradation of the self-luminous element SL is yet to grow very large.

Accordingly, the present embodiment additionally includes a process of changing, in accordance with the level of the degradation of the transistor TR, the threshold value by which it is determine whether or not the degradation of the transistor TR has progressed to a particular level or beyond in comparison with Embodiment 1. Specifically, the degradation determination threshold value determining process of step SX in the flow chart of FIG. 12 is added.

In the degradation determination threshold value determining process of step SX, the operation data, for example, the data on the IV characteristics, for the transistor TR in the initial state of the display device 100 is stored in the memory 5. On top of that, the operation data for the transistor TR acquired through monitoring by the measuring unit 4 and the operation data for the transistor TR in the initial state of the display device 100 read out from the memory 5 are used in the degradation determination threshold value determining process. Hence, a threshold value is determined for determining whether or not the level of the degradation of the transistor TR is greater than or equal to a prescribed value. Hence, the determined threshold value is used as a prescribed value for determining whether or not the next level of the degradation of the transistor TR is greater than or equal to a prescribed value.

More specifically, referring to FIG. 12, the control device 10 performs step SX of determining a threshold value for degradation measurement between step S3 and step S6. In so doing, the measuring unit 4 uses the prescribed value determined in step SX on the basis of the operation data for the transistor TR in determining in step S7 whether or not the difference between the operation data and reference operation data for the transistor TR is greater than or equal to a prescribed value. In this configuration, the threshold value that is used to determine whether or not the level of the degradation of the self-luminous element SL has exceeded a threshold value can be changed in accordance with the level of the degradation of the transistor TR. For example, the threshold value for determining whether or not the level of the degradation of the self-luminous element SL has exceeded a threshold value is reduced with an increase in the level of the degradation of the transistor TR. Therefore, it is possible to restrain the degradation of the image quality of the display panel 1 from persisting for an extended period of time or to restrain measuring the luminescence characteristics of the self-luminous element SL to no avail.

Figure 13:
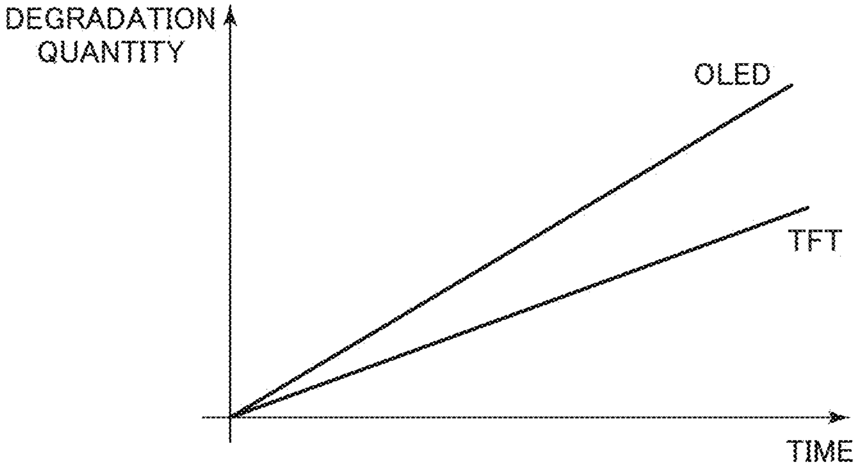
FIG. 13 is a first graph representing the relationship between the usage time and degradation quantity of a self-luminous element and a transistor in the display device in accordance with Embodiment 5.
Figure 14:
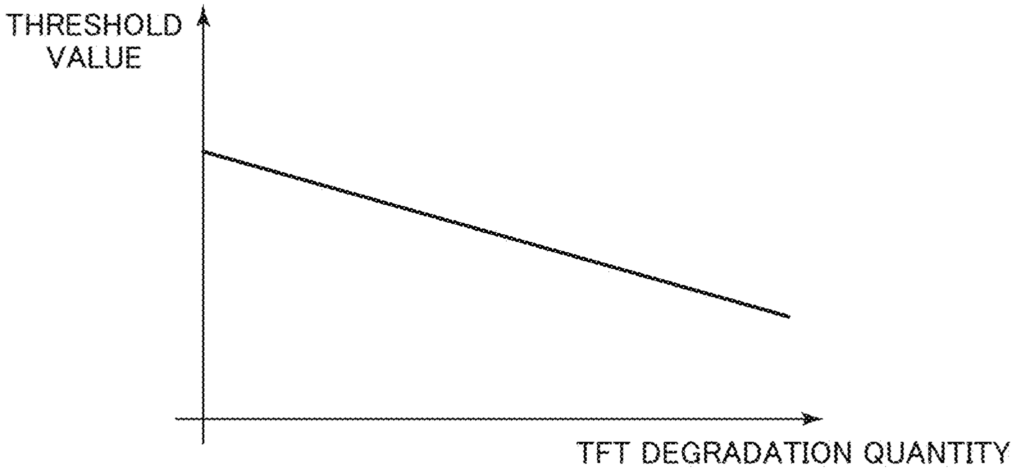
FIG. 14 is a first graph representing the relationship between the degradation quantity and threshold value of the transistor in the display device in accordance with Embodiment 5.

FIG. 13 is a first graph representing the relationship between the usage time and degradation quantity of the self-luminous element SL (OLED) and the transistor TR (TFT) in the display device 100 in accordance with the present embodiment. FIG. 14 is a first graph representing the relationship between the degradation quantity and threshold value of the transistor TR (TFT) in the display device 100 in accordance with the present embodiment.

Referring to FIG. 13, the level of the degradation of the self-luminous element SL could grow large relative to the level of the degradation of the transistor TR as the degradation (1) above progresses. In such a case, referring to FIG. 14, the frequency of measuring the self-luminous element SL is increased by reducing the threshold value for determining the degradation of the transistor TR as the degradation of the transistor TR progresses.

More specifically, a data table in which the relationship between the degradation quantity and threshold value of the transistor TR shown in FIG. 14 is specified is stored in advance in the memory 5. Hence, the correction value computation unit 6 in the correction unit 356 in the control device 10 determines a threshold value in accordance with the degradation quantity of the transistor TR by using the data table.

Figure 15:
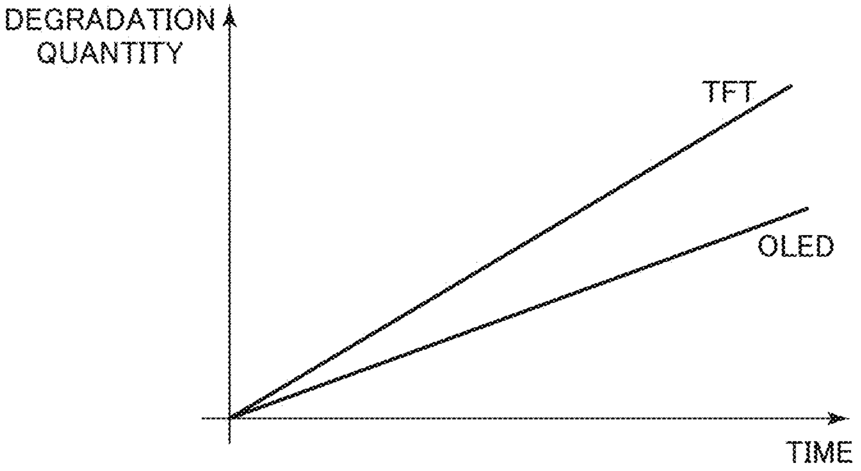
FIG. 15 is a second graph representing the relationship between the usage time and degradation quantity of the self-luminous element and the transistor in the display device in accordance with Embodiment 5.

FIG. 15 is a second graph representing the relationship between the usage time and degradation quantity of the self-luminous element SL (OLED) and the transistor TR (TFT) in the display device 100 in accordance with the present embodiment.

Figure 16:
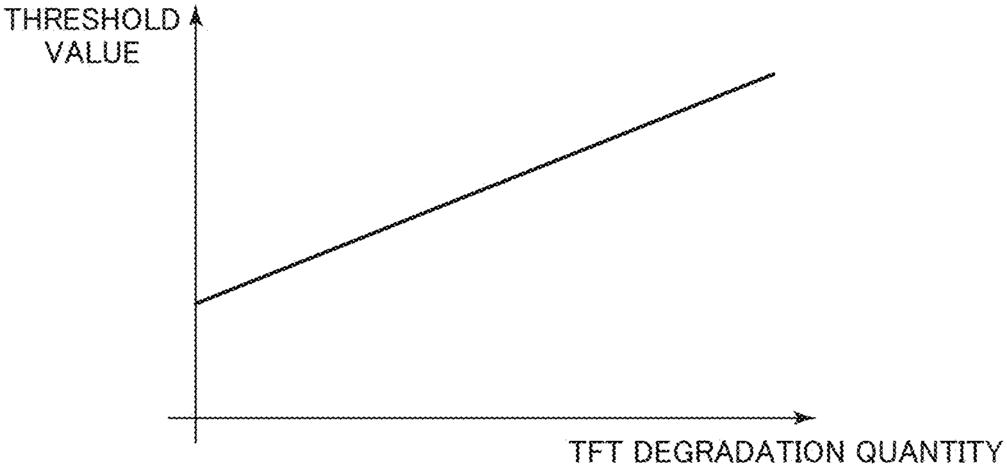
FIG. 16 is a second graph representing the relationship between the degradation quantity and threshold value of the transistor in the display device in accordance with Embodiment 5.

FIG. 16 is a second graph representing the relationship between the degradation quantity and threshold value of the transistor TR (TFT) in the display device 100 in accordance with the present embodiment.

Referring to FIG. 15, the level of the degradation of the self-luminous element SL could grow small relative to the level of the degradation of the transistor TR as the degradation (2) above progresses. In such a case, referring to FIG. 16, the frequency of measuring the self-luminous element SL is decreased by increasing the threshold value for determining the degradation of the transistor TR as the degradation of the transistor TR progresses.

More specifically, a data table in which the relationship between the degradation quantity and threshold value of the transistor TR (TFT) shown in FIG. 16 is specified is stored in advance in the memory 5. Hence, the correction value computation unit 6 in the correction unit 356 in the control device 10 determines a threshold value in accordance with the degradation quantity of the transistor TR by using the data table.

Note that in FIGS. 13 and 15, for convenience of description, straight lines are drawn assuming that the degradation of the transistor TR and the degradation of the self-luminous element SL are proportional to the increase in the usage time of the display panel 1. However, in reality, the lines could be curved, for example, if the degradation may accelerate or conversely decelerate at a point in time when the usage time of the display panel 1 has reached some value. In such a case, the line representing the relationship between the rate of change of the degradation of the transistor TR and the threshold value shown in FIGS. 14 and 16 may also be curved.

In addition, whether the degradation should be described as in (1) above or as in (2) above can vary depending on, for example, the structure and material of the transistor TR and the self-luminous element SL. Therefore, the degradation characteristics of the transistor TR and the degradation characteristics of the self-luminous element SL are preferably measured in advance so that the relationship between the degradation quantity and threshold value for the transistor TR can be specified in accordance with the degradation characteristics of the transistor TR and the degradation characteristics of the self-luminous element SL.

Figure 17:
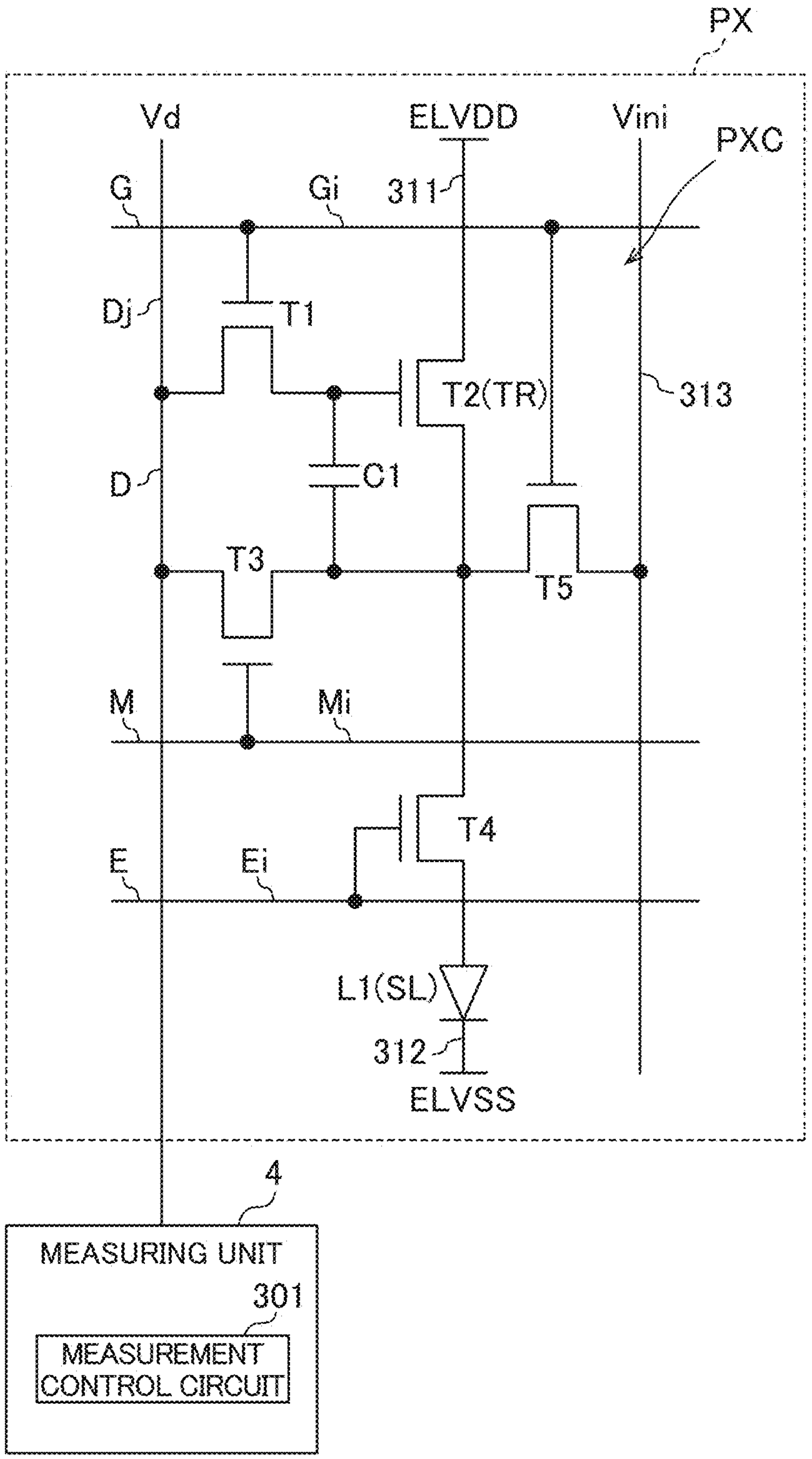
FIG. 17 is a diagram of an exemplary configuration of a pixel circuit and a measuring unit in the display device of each embodiment.

Description of Subpixels in Pixels and Internal Structure of Measuring Unit Common to All Embodiments Referring to FIG. 17, a description is given next of an example of a pixel circuit PXC formed in each of the red (R) subpixel, the green (G) subpixel, and the blue (B) subpixel formed in an image PX and an example of the measuring unit 4. FIG. 17 is a diagram of an exemplary configuration of the pixel circuit PXC and the measuring unit 4. All the pixel circuits PXC in the three types of subpixels in the plurality of pixels PX in a display panel DP are identical. The following description will discuss as an example the pixel circuit PXC in the i-th row, the j-th column in an i×j matrix, where i and j are natural numbers. The pixel circuit PXC includes a write control transistor T1, a drive transistor T2 (transistor TR), a measurement transistor T3, a light-emission control transistor T4, an initialization transistor T5, a light-emitting element L1, and a capacitor C1. Each transistor is, for example, an n-channel thin film transistor.

The pixel circuit PXC is connected to a first power supply line 311, a second power supply line 312, and a third power supply line 313. The first power supply line 311, the second power supply line 312, and the third power supply line 313 are connected to a power supply circuit (not shown). A high-level power supply voltage ELVDD is applied to the first power supply line 311. A low-level power supply voltage ELVSS is applied to the second power supply line 312. An initial voltage Vini is applied to the third power supply line 313. In addition, the pixel circuit PXC is connected to a scan line Gi, a measurement control line Mi, and a data line Dj. The data line Dj is a line for applying voltage to the gate of the drive transistor T2.

The gate of the write control transistor T1 is connected to the scan line Gi. The drain of the write control transistor T1 is connected to the data line Dj. The source of the write control transistor T1 id connected to one of the two terminals of the capacitor C1 and the gate of the drive transistor T2. The write control transistor T1, when turned on, electrically connects the data line Dj to the gate of the drive transistor T2.

The drain of the drive transistor T2 (transistor TR) is connected to the first power supply line 311. The source of the drive transistor T2 (transistor TR) is connected to the other terminal of the capacitor C1, the measurement transistor T3, the light-emission control transistor T4, and the initialization transistor T5.

The measurement transistor T3 switches on/off on the basis of the level on a measurement control line M. When the measurement transistor T3 is ON, a current flows through either the drive transistor T2 (transistor TR) or a self-luminous element L1 (self-luminous element SL).

For instance, the measurement transistor T3 is built around a thin film transistor. The thin film transistor in the measurement transistor T3 can pass current in a bidirectional manner. The gate of the measurement transistor T3 is connected to the measurement control line Mi. In addition, one of the two non-gate terminals of the measurement transistor T3 is connected to the data line Dj. In addition, the other one of the two non-gate terminals of the measurement transistor T3 is connected to the capacitor C1, the drive transistor T2, the light-emission control transistor T4, and the initialization transistor T5.

The light-emission control transistor T4 switches between supply and non-supply of a current to the self-luminous element L1 (self-luminous element SL). In other words, the light-emission control transistor T4 controls the emission of light by the self-luminous element L1 (self-luminous element SL). The gate of the light-emission control transistor T4 is connected to a light-emission control line Ei. The anode of the self-luminous element L1 (SL) is connected to the light-emission control transistor T4. The cathode of the self-luminous element SL (L1) is connected to the second power supply line 312.

The gate of the initialization transistor T5 is connected to the scan line Gi. One of the two non-gate terminals of the initialization transistor T5 is connected to the third power supply line 313. The other one of the two non-gate terminals of the initialization transistor T5 is connected to the capacitor C1, the drive transistor T2, the measurement transistor T3, and the light-emission control transistor T4.

The measuring unit 4 controls the measurement transistor T3 so as to pass a current through an element characteristics of which are to be measured. The measuring unit 4 includes, for example, a measurement control circuit 301. The measurement control circuit 301 measures either the amount of current flowing into the measuring unit 4 or the amount of current flowing out of the measuring unit 4 as a characteristics value. More specifically, the measurement control circuit 301 includes, for example: a resistor through which the current flowing into the measuring unit 4 or the current flowing out of the measuring unit 4 passes; and an A/D converter for acquiring the voltage produced across the resistor and converting into digital data.

Figure 18:
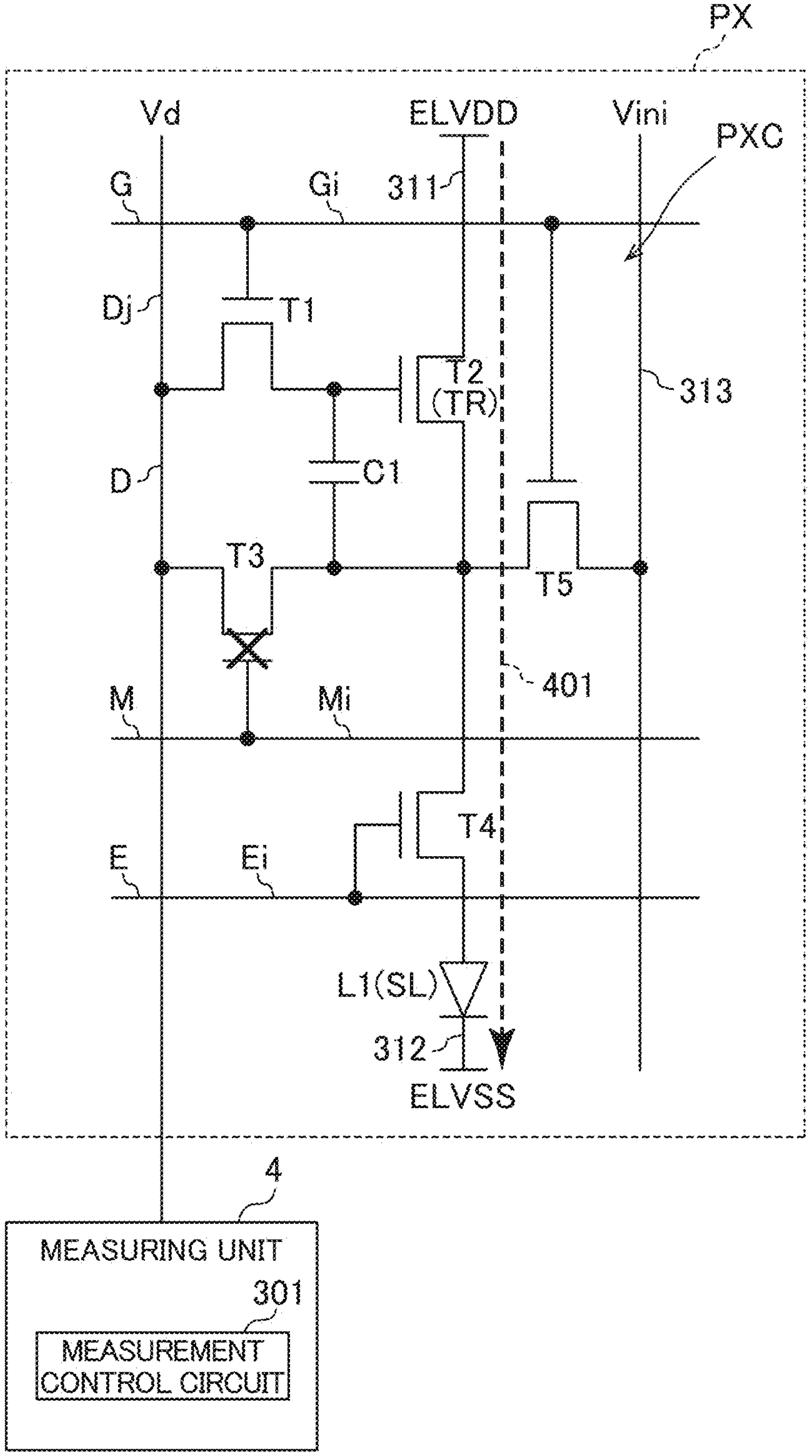
FIG. 18 is a diagram of an exemplary current path when a correction image is fed to the pixel circuit in the display device of each embodiment.

Referring to FIG. 18, a description is given next of an operation performed when the pixel circuit PXC is fed with a correction image. The display control unit 2 causes a scan line drive circuit (not shown) to switch ON-level scan lines Gi for each horizontal scan period. The scan lines Gi (i=1 to m, where m is a natural number greater than or equal to 2) sequentially and exclusively go on. Note that the display control unit 2 maintains the measurement control line M at the OFF level, thereby maintaining the measurement transistor T3 turned off.

When the scan line Gi is at the ON level, the write control transistor T1 in the pixel circuit PXC in the i-th row is ON. Hence, the gate potential of the drive transistor T2 (TR) approaches a data voltage Vd applied to the data line Dj. As a result, the drive transistor T2 (transistor TR) is turned on. In addition, while an image is being displayed, the display control unit 2 turns on the light-emission control transistor T4 in each pixel circuit PXC. For example, the display control unit 2 instructs the scan line drive circuit (not shown) to render the level on the light-emission control line Ei (i=1 to m, where m is a natural number greater than or equal to 2) the ON level. Hence, a current flows toward the self-luminous element L1 (self-luminous element SL) via a current path 401 shown as an example in FIG. 18 so that the self-luminous element L1 (self-luminous element SL) emits light with a luminance that is in accordance with the voltage value of the data voltage Vd.

As the select period for the scan line Gi ends, the scan line drive circuit (not shown) changes the scan line Gi to the OFF level. Hence, the write control transistor T1 is turned off in the pixel circuit PXC. Even if the write control transistor T1 is turned off in the pixel circuit PXC, the capacitor C1 retains the gate-to-source voltage of the drive transistor T2. Therefore, the drive transistor T2 continuously passes the current that is in accordance with the voltage retained by the capacitor C1 through the self-luminous element L1 (self-luminous element SL) until the scan line Gi goes ON again. Hence, the self-luminous element L1 (self-luminous element L1) continuously emits light until the scan line Gi goes ON again.

Here, taking the potential on the second power supply line 312 as a reference, the voltage applied to the gate of the drive transistor T2 (TR) is a sum of the voltage that should be applied to the self-luminous element L1 (self-luminous element SL) to pass a prescribed current through the self-luminous element L1 (self-luminous element SL) and the voltage that should be applied across the gate and source of the drive transistor T2 (TR) to pass a prescribed current through the drive transistor T2 (TR). To this end, in step S203 in FIG. 6 above, a drive voltage value is calculated that is a sum of the voltage that should be applied across the gate and source of the transistor TR and the voltage that should be applied to the self-luminous element SL.

Figure 19:
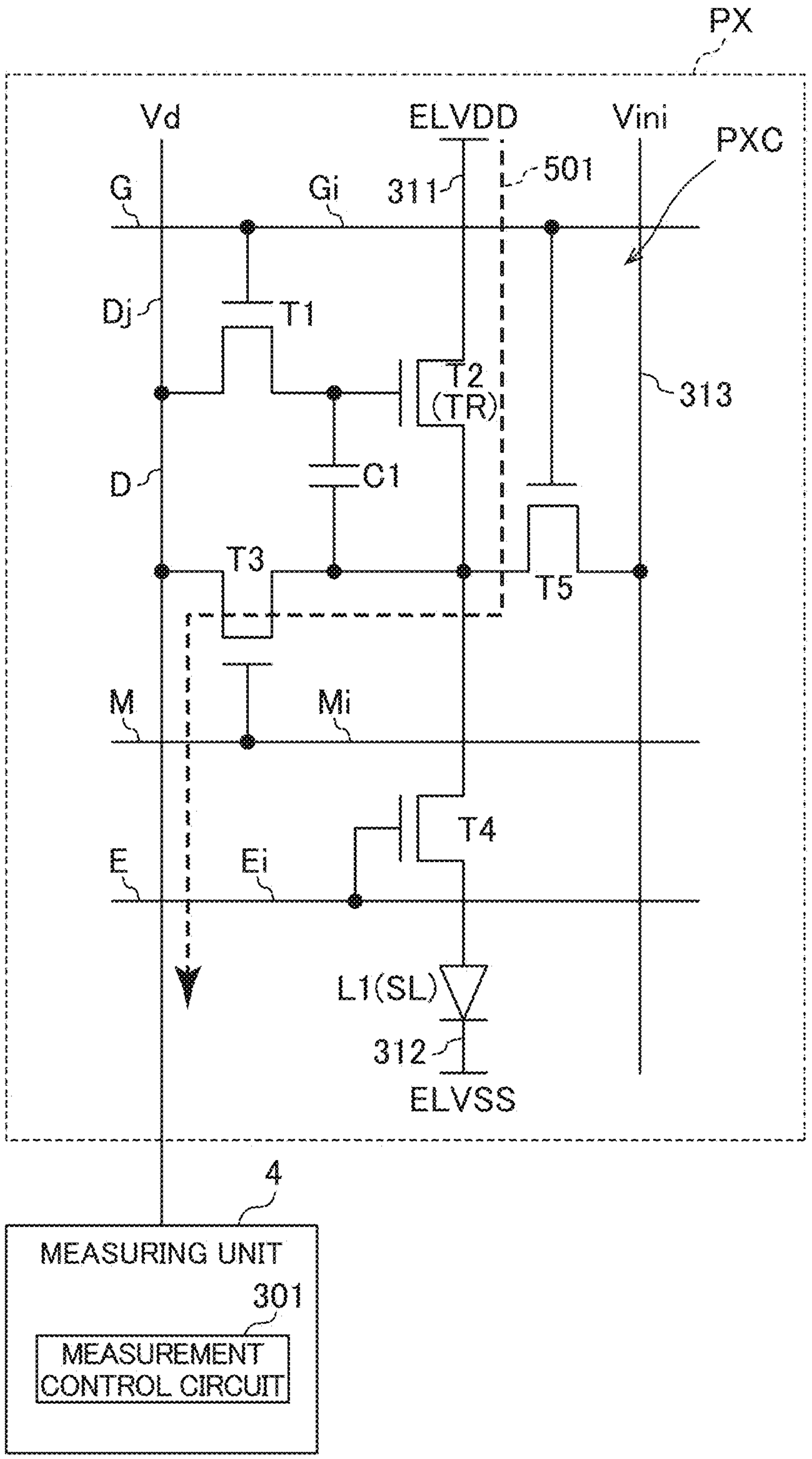
FIG. 19 is a diagram of an exemplary current path when the characteristics of a drive transistor in the display device of each embodiment are measured.

Referring to FIG. 19, a description is given next of a case where the measuring unit 4 measures the operating characteristics of the drive transistor T2 (transistor TR).

The measuring unit 4 instructs a data line drive circuit (not shown) to apply a voltage of a measurement-use voltage value to the data line Dj for the pixel circuit PXC that is a measurement target. Thereafter, the measuring unit 4 instructs the scan line drive circuit (not shown) to change the level on the scan line Gi for the pixel circuit PXC that is a measurement target to the ON level. Hence, the write control transistor T1 in the pixel circuit PXC that is the measurement target is turned on. As a result, the voltage of the measurement-use voltage value is applied to the capacitor C1. The voltage on one of the two terminals of the capacitor C1 rises, turning on the drive transistor T2. Up to this stage, the measuring unit 4 instructs the scan line drive circuit (not shown) to maintain the measurement transistor T3 in the pixel circuit PXC that is the measurement target turned off. In addition, the measuring unit 4 instructs the scan line drive circuit (not shown) to maintain the light-emission control line Ei for the pixel circuit PXC that is the measurement target at the OFF level. Hence, the light-emission control transistor T4 is maintained turned off.

By turning on the drive transistor T2 (transistor TR), a current starts to flow in accordance with the electric charge accumulated in the capacitor C1. As the application of the voltage of a measurement-use voltage value V2 to the data line Dj for the pixel circuit PXC that is the measurement target is stopped, the measuring unit 4 instructs the scan line drive circuit (not shown) to cause the measurement transistor T3 in the pixel circuit PXC that is the measurement target to conduct. As a result, a current flows through the first power supply line 311, the drive transistor T2, the measurement transistor T3, and the data line Dj toward the measuring unit 4. In other words, a current flows through a current path 501 shown as an example in FIG. 19 toward the measuring unit 4, and no current flows through the self-luminous element L1 (self-luminous element L1). Then, the measurement control circuit 301 measures the amount of current flowing into the measuring unit 4.

Figure 20:
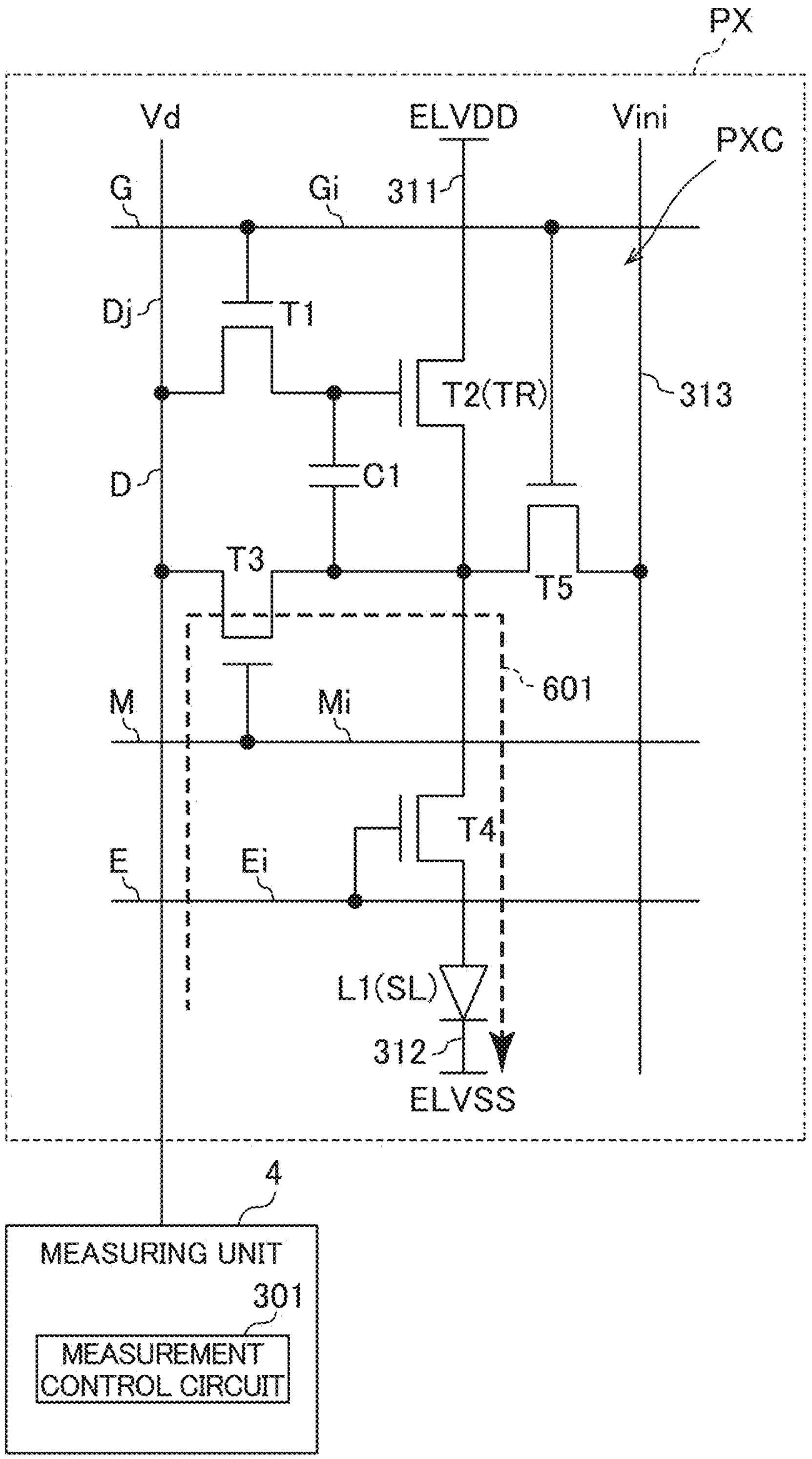
FIG. 20 is a diagram of an exemplary current path when the characteristics of the self-luminous element in the display device of each embodiment are measured.

Referring to FIG. 20, a description is given next of a case where the measuring unit 4 measures the characteristics of the self-luminous element SL (L1).

The measuring unit 4 instructs the data line drive circuit (not shown) and the scan line drive circuit (not shown) to turn off the drive transistor T2 in the pixel circuit PXC that is the measurement target. Next, the measuring unit 4 instructs the scan line drive circuit (not shown) to turn off the write control transistor T1 in the pixel circuit PXC that is the measurement target. Hence, the drive transistor T2 in the pixel circuit PXC that is the measurement target is maintained turned off. In addition, the measuring unit 4 instructs the scan line drive circuit (not shown) to turn on the light-emission control transistor T4 in the pixel circuit PXC that is the measurement target.

Next, the measuring unit 4 instructs the data line drive circuit (not shown) so that the data line drive circuit (not shown) applies a voltage of the measurement-use voltage value V2 to the data line Dj for the pixel circuit PXC that is the measurement target. Hence, the voltage of V2 is applied to the self-luminous element SL (L1) in the pixel circuit PXC that is the measurement target so that a current that is in accordance with the measurement-use voltage value V2 flows through the self-luminous element SL (L1). In other words, in this state, a current flows via a current path 601 shown as an example in FIG. 20 and from the measuring unit 4, passing through the self-luminous element SL (L1), toward the second power supply line 312. Then, the measurement control circuit 301 measures the amount of current flowing out of the measuring unit 4.

The control device for a display panel and the control method by a control device for a display panel in each embodiment described above may be combined so long as they do not contradictory to each other. For example, the control that uses the temperature sensor TH described in Embodiment 2 may be combined with the degradation determination threshold value determining process described in Embodiment 5. The same description applies to other combinations as well.

The invention claimed is:

1. A control device for a display panel including a plurality of pixels, each of the plurality of pixels including:

a light-emitting diode; and a transistor that controls a current that flows through the light-emitting diode, wherein the control device:

measures a luminescence characteristic of the light-emitting diode and an operating characteristic of the transistor, and corrects an input video signal that enables identifying a video, to be displayed on the display panel, based on luminescence data related to the luminescence characteristic and operation data related to the operating characteristic, and the luminescence characteristic is measured at a frequency that is lower than a frequency at which the operating characteristic is measured, wherein the luminescence characteristic is measured only when it is determined that the operation characteristic of the transistor has degraded by at least a specific value by determining whether or not the operation data differs from reference operation data of the transistor by at least a prescribed value.

2. The control device for the display panel according to claim 1, wherein the luminescence characteristic is measured using the operation data obtained from a present measurement of the operating characteristic as the reference operation data in a next determination as to whether or not the operation data differs from the reference operation data by at least the prescribed value.

3. The control device for the display panel according to claim 1, wherein the luminescence characteristic is estimated from the operation data when the operation data differs from the reference operation data by less than the prescribed value.

4. The control device for the display panel according to claim 1, wherein even when the operation data differs from the reference operation data of the transistor by less than the prescribed value, the luminescence characteristic is measured when the operating characteristic has been measured at least a prescribed number of times.

5. The control device for the display panel according to claim 1, wherein the prescribed value is determined based on the operation data in determining whether or not the operation data differs from the reference operation data of the transistor by at least the prescribed value.

6. The control device for the display panel according to claim 1, wherein the input video signal is corrected based on the luminescence data, the operation data, and temperature data measured by a temperature sensor configured to measure a temperature of the display panel.

7. A display device comprising:

the display panel; and the control device according to claim 1.

* * * * *